(12) United States Patent
Najafirad et al.

(10) Patent No.: US 10,963,581 B2
(45) Date of Patent: Mar. 30, 2021

(54) SYSTEMS AND METHODS FOR SECURE FILE TRANSMISSION AND CLOUD STORAGE

(71) Applicants: Peyman Najafirad, San Antonio, TX (US); Mohan Muppidi, San Antonio, TX (US); Sos Agaian, San Antonio, TX (US); Mo Jamshidi, San Antonio, TX (US)

(72) Inventors: Peyman Najafirad, San Antonio, TX (US); Mohan Muppidi, San Antonio, TX (US); Sos Agaian, San Antonio, TX (US); Mo Jamshidi, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 491 days.

(21) Appl. No.: 15/574,935

(22) PCT Filed: May 20, 2016

(86) PCT No.: PCT/US2016/033509
§ 371 (c)(1),
(2) Date: Nov. 17, 2017

(87) PCT Pub. No.: WO2016/187529
PCT Pub. Date: Nov. 24, 2016

(65) Prior Publication Data
US 2018/0165466 A1    Jun. 14, 2018

Related U.S. Application Data

(60) Provisional application No. 62/164,185, filed on May 20, 2015.

(51) Int. Cl.
*G06F 21/60* (2013.01)
*G06F 21/62* (2013.01)
(Continued)

(52) U.S. Cl.
CPC ........ *G06F 21/6209* (2013.01); *G06F 17/141* (2013.01); *G06F 21/602* (2013.01);
(Continued)

(58) Field of Classification Search
CPC ............................ G06F 21/60; G06F 21/6208
See application file for complete search history.

(56) References Cited

U.S. PATENT DOCUMENTS 6,011,847 A * 1/2000 Follendore, III ... G06F 21/6209
713/160
8,225,109 B1 * 7/2012 Kalligudd ........... G06F 11/1464
713/193

(Continued)

OTHER PUBLICATIONS

Li et al, "Multiple-image encryption based on triple interferences for flexibly decrypting high-quality images", pp. 3273-3279, Apr. 2015. (Year: 2015).*

(Continued)

*Primary Examiner* — Ponnoreay Pich
(74) *Attorney, Agent, or Firm* — Thomas | Horstemeyer LLP

(57) ABSTRACT

Disclosed are systems and methods to encrypt an image for secure image transmission and parallel decryption using resources from a networked environment. Upon reception of encrypted data from the mobile user, the data can be decrypted by transforming the data, decrypting the transformed data, and inversing the transformation. The decrypted data can be sent for storage in a cloud storage.

20 Claims, 21 Drawing Sheets

(51) Int. Cl.

| | | |
|---|---|---|
| *H04N 19/184* | (2014.01) | |
| *H04N 19/132* | (2014.01) | |
| *H04N 19/154* | (2014.01) | |
| *H04N 19/467* | (2014.01) | |
| *H04N 19/60* | (2014.01) | |
| *H04N 19/88* | (2014.01) | |
| *H04W 12/00* | (2021.01) | |
| *H04W 12/06* | (2021.01) | |
| *G06F 17/14* | (2006.01) | |
| *H04L 29/06* | (2006.01) | |
| *H04W 12/02* | (2009.01) | |
| *H04W 12/04* | (2021.01) | |
| *H04L 29/08* | (2006.01) | |

(52) U.S. Cl.
CPC ....... *H04L 63/0281* (2013.01); *H04N 19/132* (2014.11); *H04N 19/154* (2014.11); *H04N 19/184* (2014.11); *H04N 19/467* (2014.11); *H04N 19/60* (2014.11); *H04N 19/88* (2014.11); *H04W 12/0013* (2019.01); *H04W 12/02* (2013.01); *H04W 12/04* (2013.01); *H04W 12/0609* (2019.01); *H04L 67/1097* (2013.01); *H04L 2209/76* (2013.01); *H04L 2209/80* (2013.01)

(56) References Cited

U.S. PATENT DOCUMENTS

| | | |
|---|---|---|
| 8,872,814 B1 | 10/2014 | Agaian et al. |
| 8,954,876 B1 | 2/2015 | Hobbs |
| 2001/0014158 A1* | 8/2001 | Baltzley ................ H04L 63/126 380/281 |
| 2002/0041680 A1* | 4/2002 | Cybenko ............... G06F 21/125 380/28 |
| 2003/0202707 A1 | 10/2003 | Thyagarajan et al. |
| 2005/0074125 A1 | 4/2005 | Chavanne et al. |
| 2008/0049854 A1 | 2/2008 | Kim et al. |
| 2009/0290707 A1* | 11/2009 | Schneider ........... G06F 21/6209 380/45 |
| 2009/0300356 A1 | 12/2009 | Crandell |
| 2011/0019816 A1* | 1/2011 | Inami ................... G06F 21/608 380/28 |
| 2011/0154063 A1* | 6/2011 | Tani ...................... G06F 21/602 713/193 |
| 2011/0276563 A1 | 11/2011 | Sandoval et al. |
| 2013/0024720 A1 | 1/2013 | Aggarwal et al. |
| 2013/0167228 A1* | 6/2013 | Wong .................... G06F 21/62 726/19 |
| 2013/0305383 A1 | 11/2013 | Garralda et al. |
| 2014/0072240 A1 | 3/2014 | Lee et al. |
| 2014/0270462 A1 | 9/2014 | Narendra et al. |
| 2015/0295711 A1* | 10/2015 | Javidi .................... G09C 5/00 713/193 |

OTHER PUBLICATIONS

Rad, Paul, et al., "A novel image encryption method to reduce decryption execution time in cloud." Systems Conference (SysCon), 2015 9th Annual IEEE International. IEEE, 2015.

Rad, Paul, et al., "Secure Proxy Service Using p-Fibonacci Transformation of Cosine Coefficients on Cloud File Sharing Environment." High Performance Computing and Communications (HPCC), 2015 IEEE 7th International Symposium on Cyberspace Safety and Security (CSS), 2015 IEEE 12th International Conferen on Embedded Software and Systems (ICESS), 2015 IEEE 17th International Conference on. IEEE, 2015.

International Search Report for PCT/US2016/033509 dated Aug. 16, 2016.

* cited by examiner

512x512 Original Image
803
DCT Transform (NxN)
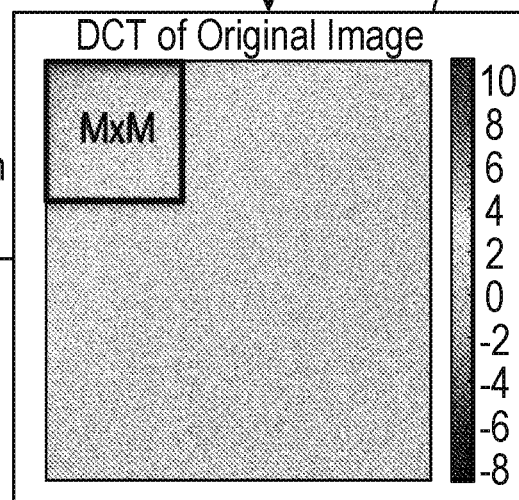
806
(128x128) Image
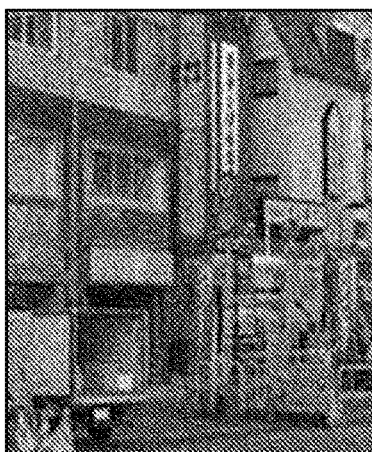
809
DCT Transform (MxM)
Mean Square Error = 237.150475
Signal to Noise Ratio = 55.449238
Bovik Index = 0.572024
FIG. 8

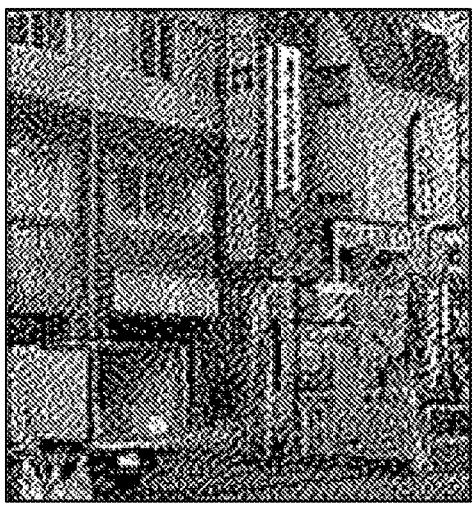 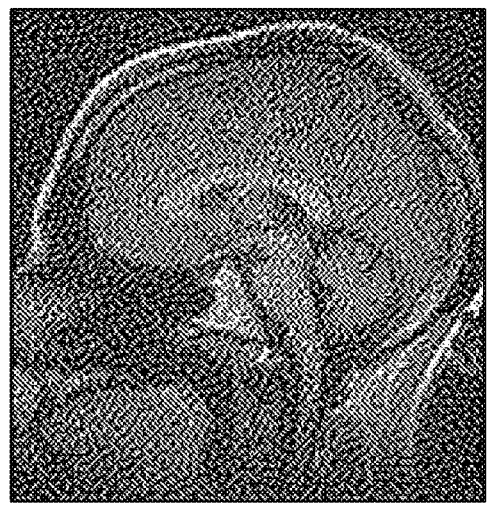
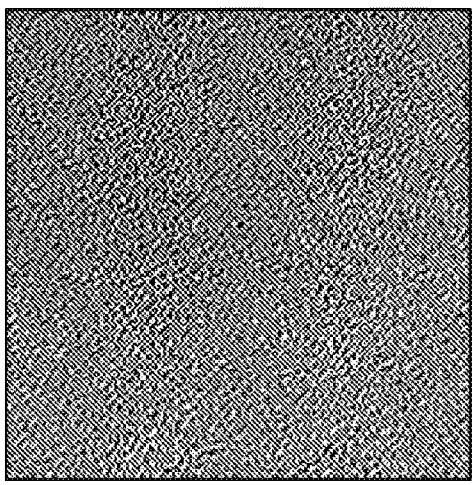 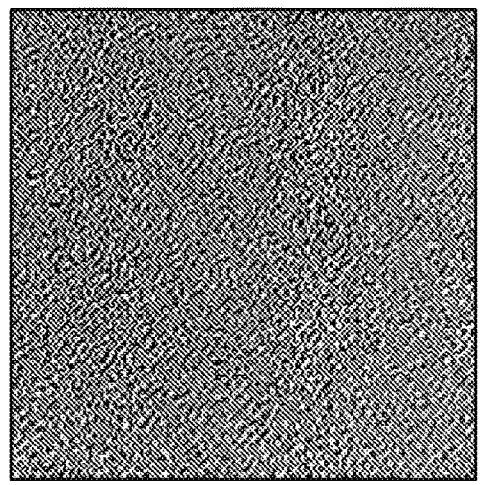
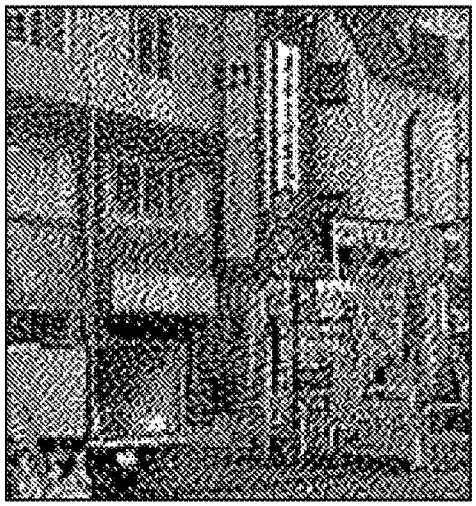 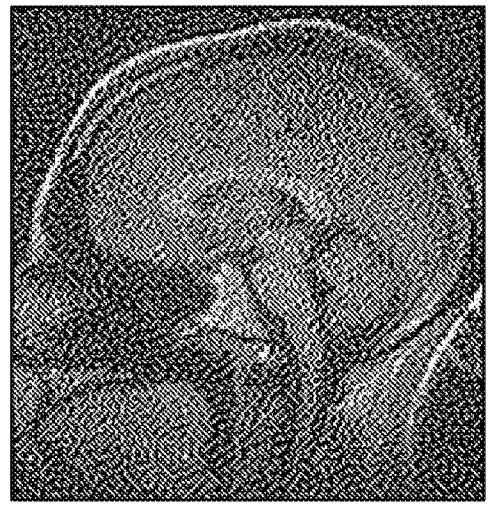
FIG. 10A　　　　　　FIG. 10B

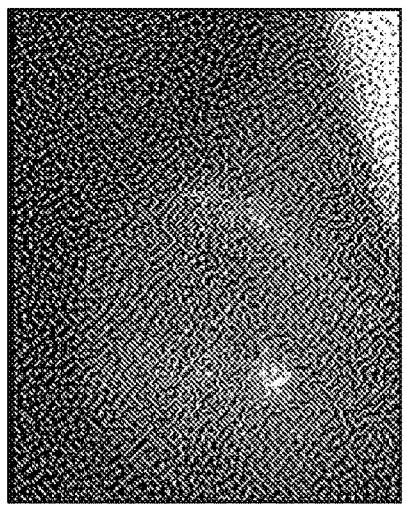
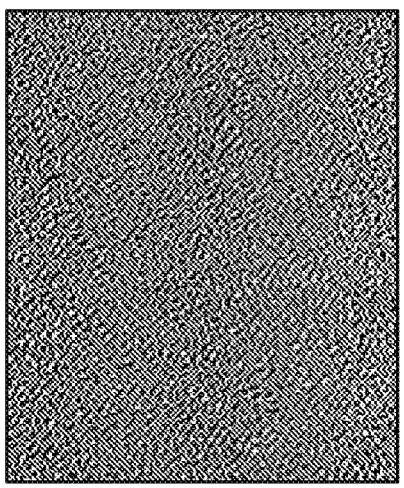
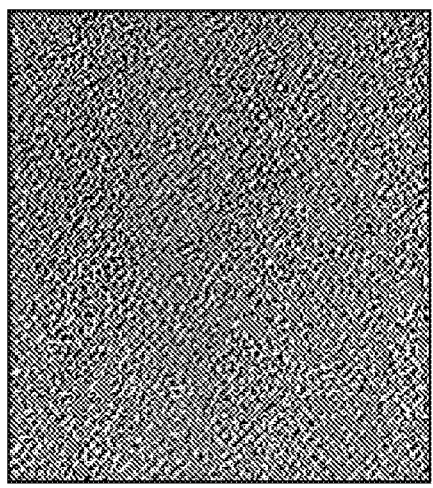
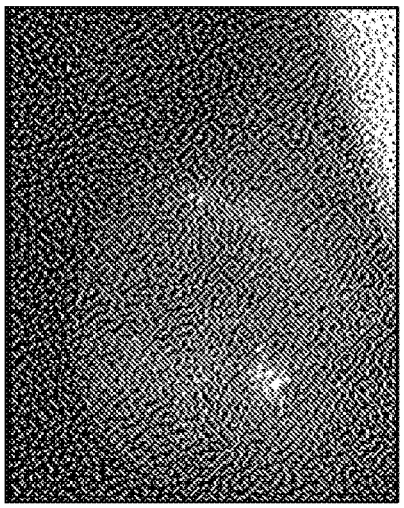
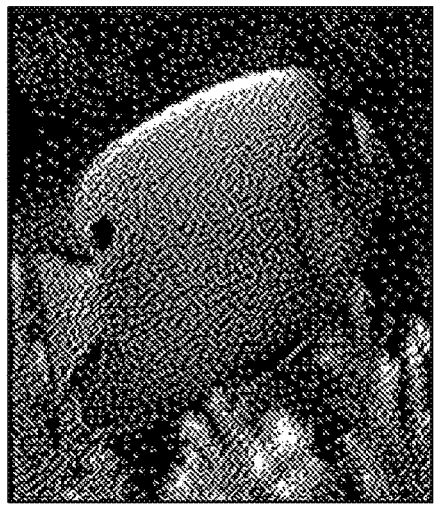
FIG. 10C  FIG. 10D

SYSTEMS AND METHODS FOR SECURE FILE TRANSMISSION AND CLOUD STORAGE

CROSS-REFERENCE TO RELATED APPLICATIONS

This application is the 35 U.S.C. § 371 national stage application of PCT Application No. PCT/US2016/033509, filed May 20, 2016, where the PCT claims the benefit of U.S. Provisional Application No. 62/164,185, entitled "SYSTEMS AND METHODS FOR SECURE FILE TRANSMISSION AND STORAGE," filed on May 20, 2015, both of which are herein incorporated by reference in their entireties.

BACKGROUND

Cloud based services are being delivered by more than 87,000 companies around the world. Over 300 million pictures are being uploaded to Facebook every day and over 300 petabytes of data are being stored in their data warehouses. The applications of Cloud computing can be seen in broad range of fields, such as, for example, social networking, healthcare, defense, NASA, etc. Increased use of mobile devices has encouraged developers to explore ways of making their applications fast and reliable.

SUMMARY

Certain embodiments of the present disclosure are directed to a system and method that includes a memory device and a mobile computing device with a hardware processor in communication with the memory device. In some embodiments, the mobile computing device is configured to obtain at least one encryption key associated with the mobile computing device, perform at least one image transformation on an image to generate a transformed image, perform at least one image encryption on the transformed image to generate a transformed encrypted image based at least in part on the at least one encryption key, perform at least one image inverse transformation on the transformed encrypted image to generate an encrypted image, and transmit the encrypted image to a server for storage in a cloud storage service.

In some embodiments, the mobile computing device is further configured to obtain at least one second encryption key, perform the at least one image transformation on a second image to generate a second transformed image, perform the at least one image encryption on the second transformed image to generate a second transformed encrypted image based at least in part on the at least one second encryption key, perform the at least one image inverse transformation on the second transformed encrypted image to generate a second encrypted image, and transmit the second encrypted image to the server for storage in the cloud storage service. In one embodiment, the mobile computing device is further configured to receive the encrypted image from the cloud storage service, perform the at least one image transformation on the encrypted image to generate the transformed encrypted image, perform at least one image decryption on the transformed encrypted image to generate the transformed image based at least in part on the at least one encryption key, and perform the at least one image inverse transformation on the transformed image to generate the image.

In some embodiments, the at least one image decryption is configured to reverse the at least one image encryption when a same key is used. In some embodiments, the mobile computing device is further configured to determine an image quality threshold value for at least one of: a mean square error, a signal to noise ratio, or a Bovik index based at least in part on a bandwidth on an internet connection associated with the mobile computing device, and decrease a resolution of the image when generating the transformed image, the resolution of the image being based at least in part on a an image quality of the image meeting the image quality threshold.

In some embodiments, the at least one image transformation includes performing a discrete Fourier transform on the image to generate the transformed image. In some embodiments, the at least one image encryption includes decomposing DCT coefficients of the transformed image into a plurality of Fibonacci P-code bit-planes based at least in part on a first encryption key of the at least one encryption key, shuffling an order of the plurality of Fibonacci P-code bit-planes to generated a shuffled plurality of Fibonacci P-code bit-planes based at least in part on a second encryption key of the at least one encryption key, combining the shuffled plurality of Fibonacci P-code bit-planes to generate a combined plurality of Fibonacci P-code bit-planes based at least in part on a third encryption key of the at least one encryption key, and mapping the combined plurality of Fibonacci P-code bit-planes to an RGB plane to generate the encrypted image. In some embodiments, the at least one encryption key associated with the mobile computing device is obtained from a remote server.

Certain embodiments of the present disclosure are directed to a system and method including identifying, via at least one computing device, an encryption key associated with a user account, transforming, via the at least one computing device, a file into a transformed file image using a transformation algorithm, encrypting, via the at least one computing device, the transformed file into a transformed encrypted file using an encryption algorithm based at least in part on the encryption key, and transforming, via the at least one computing device, the transformed encrypted file into an encrypted file using an inverse transformation algorithm.

In some embodiments, the system and method include obtaining, via the at least one computing device, the file from a secure cloud storage. In some embodiments, the system and method include transmitting the encrypted file to a mobile computing device associated with the user account. In some embodiments, the encrypted file is transmitted on a first side of a firewall, and the file is transformed and encrypted on a second side of the firewall.

In some embodiments, the system and method include receiving, via the at least one computing device, a plurality of encrypted files from a plurality of mobile computing devices, individual ones of the plurality of mobile computing devices corresponding to a respective user account, transforming, via the at least one computing device, the plurality of encrypted files to generate a plurality of transformed encrypted files using the transformation algorithm, decrypting, via the at least one computing device, individual ones of the plurality of transformed encrypted files to generate a plurality of transformed files using a decryption algorithm based at least in part on a respective encryption key that corresponds to the respective user account, transforming, via the at least one computing device, the plurality of transformed files to generate a plurality of files using the inverse transformation algorithm, and storing, via the at least one computing device, the plurality of files in a secure cloud storage.

In some embodiments, the at least one computing device includes a plurality of parallel decryption cloud-based servers and the plurality of encrypted files are queued for parallel decryption and transformation by the plurality of parallel decryption cloud-based servers.

Certain embodiments of the present disclosure are directed to a system and method that includes a cloud-based storage that includes a file, and at least one computing device in communication with the cloud-based storage. In some embodiments, the at least one computing device configured to receive a request for the file from a remote computing device associated with a user account, identify an encryption key associated with the user account, retrieve the file from the cloud-based storage, and apply an encryption algorithm to the file to generate an encrypted file based at least in part on the encryption key, the encryption algorithm including a transformation and an inverse transformation of the file.

In some embodiments, the at least one computing device is further configured to transmit the encrypted file to the remote computing device. In some embodiments, the encryption key is a private random phase key and the encryption algorithm utilizes complex conjugate properties of the file. In some embodiments, the at least one computing device includes a plurality of encryption servers executed in parallel, and the file is encrypted by one of the plurality of encryption servers. In some embodiments, the plurality of encryption servers are spawned on demand. In some embodiments, the at least one computing device is further configured to generate a network page that includes data from the file.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 8 shows an example Discrete Cosine Transform (DCT) energy compaction of a correlated image as implemented by the networked environment according to various example embodiments.

FIG. 10A-D shows example photographs that show the encryption stages for an image performed in the networked environment according to various example embodiments.

DETAILED DESCRIPTION

Figure 1:
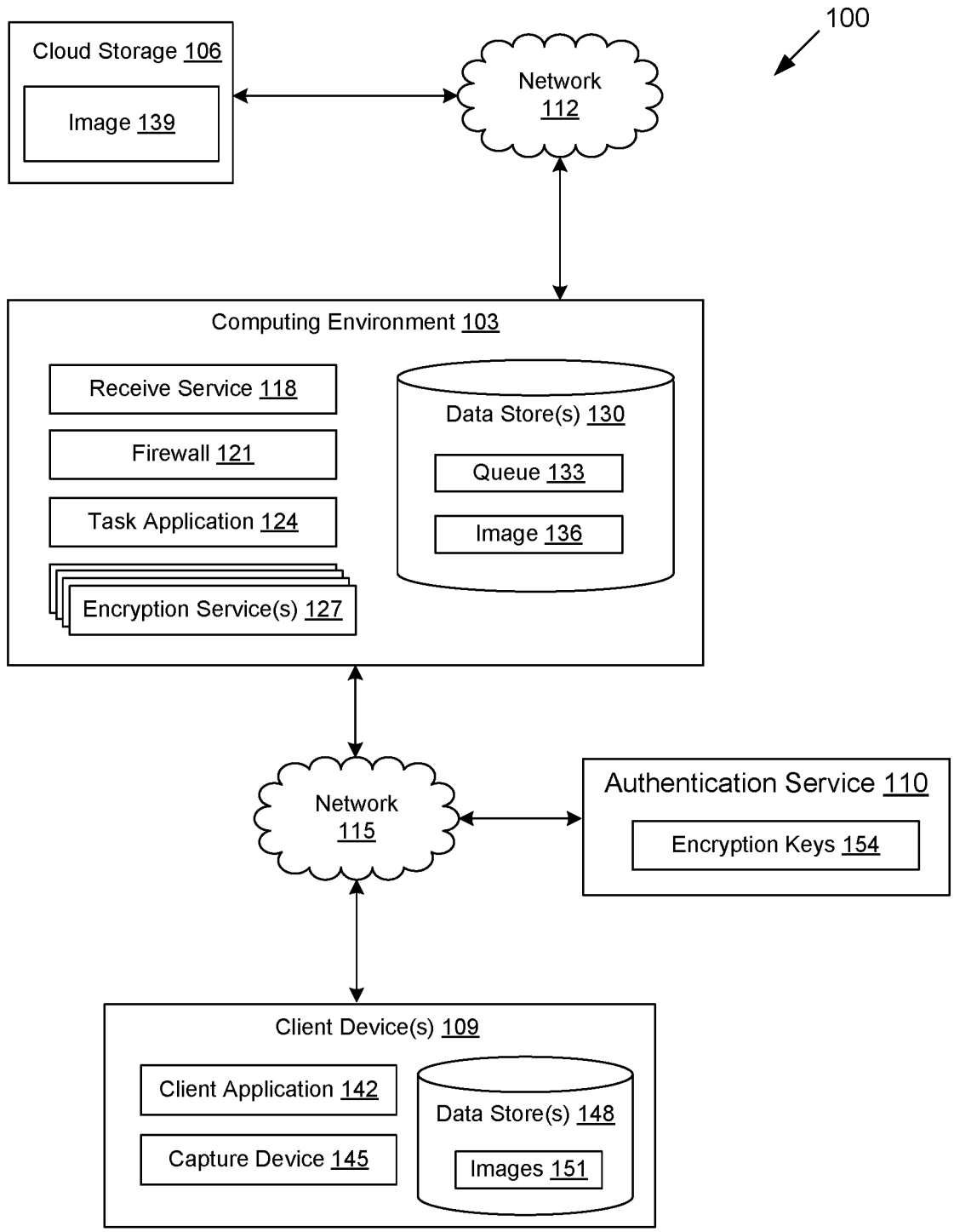
FIG. 1 is a drawing of a networked environment according to various example embodiments.

The present disclosure relates to systems and methods for encrypting and decrypting data, for example, digital images, in a network environment. The present disclosure also provides the architecture for secure image transfer through a secure proxy service to a cloud file sharing environment. In particular, the present disclosure relates to transferring the data securely to a cloud computing environment, such as a cloud file sharing environment. The cloud file sharing environment can include decryption servers that can be configured to decrypt data, such as digital images, in parallel. The cloud file sharing environment can also be configured to store the data associated with the digital images.

Demand for secure file sharing systems has amplified due the increased use of cloud computing resources in different fields where privacy is the most important requirement or for storing crucial data like criminal records, biometry information, etc. The markets for using a secure file sharing system include, for example, healthcare providers (securing data from insurance providers), state and local police departments (safeguarding the crucial evidence), social networking companies (secure transmission of personal images of customers to ensure privacy), department of defense, cloud based backup providers, mobile applications.

Technologies being applied to big data include massive parallel processing databases, data mining grids, distributed file systems, distributed databases, cloud computing platforms, the internet, and scalable storage systems. OpenStack Swift is one example of a data processing tool that is a highly deployed open source cloud storage solution. The OpenStack Swift ring represents a mapping between the names of entities stored on disk and their physical location. Embodiments of the present disclosure provide a method for implementing dual encrypted Proxy Service for an object storage environment to provide the privacy and authentication. This can be used for fields such as, for example, online backup systems, Medicare, Biometrics and secure transfer of large amounts of data.

In situations in which digital image processing applications are too computation intensive to perform on a mobile or wearable device, the data associated with the images can be transferred to the cloud and the computation can be performed in the cloud. Embodiments of the present disclosure describe an encryption technique based on a private random phase key and complex conjugate properties of an image. The decryption systems and methods described herein can be performed in parallel by decryption servers executed by a cloud computing environment.

According to some embodiments, the encoding of an image can be performed using a fast Fourier transform (FFT) complex conjugate property of the image and a private random phase key value shared between a device sending the image and the computing environment, such as for example, a server, receiving the image. First, using FFT complex conjugate property, a two dimensional matrix consisting of real and imaginary portions of the image can be determined. Second, the complex conjugate matrix can be encrypted using the private random phase key value shared between the device sending the image and the computing environment receiving the image. Cloud resources can be used for the parallel image encryption and decryption methods described herein.

Turning to FIG. 1, shown is a networked environment 100 according to various embodiments of the present disclosure. The networked environment 100 can include a computing environment 103, a cloud storage 106, client devices 109, an authentication service 110, a first network 112, and a second network 115.

The computing environment 103 can include a receive service 118, a firewall 121, a task application 124, one or more encryption service 127, and a data store 130. The data store 130 can include a queue 133 of images to be processed and stored images 136. The receive service 118 can receive images from client devices 109. The receive service 118 can add the received images to the queue 133 for processing. The encryption service 127 can load the images from the queue 133 for encryption or decryption.

The client device 109 can include a client application 142, a capture device 145, and a data store 148, which can store images 151. The cloud storage 106 can store images 139. The cloud storage 106 can be provided by any cloud storage provider. The provider may provide access to the data through an Application Programmable Interface (API). As an example, the encryption service 127 can access images 139 in cloud storage 106 by performing a call to an API provided by the cloud storage 106.

In one embodiment, images can be encrypted for transmission over an insecure network 115 and later decrypted for storage in a secure storage device. The client application 142 can capture an image on the capture device 145. The image can be stored in data store 148 as an image 151 on a local data store 148.

The client application 142 can secure the image using an encryption key. The client application 142 can identify an encryption key to secure the image. The client application 142 can prompt a user for the encryption key. In one embodiment, the client application 142 generates the encryption key based on biometric information obtained from a user. The biometric information can be based on one or more biometric sensors associated with the client device 109. For example, the client device 109 can include a rental scanner, a fingerprint scanner, or another type of biometric scanner. In another embodiment, the client application 142 uses a password obtained from a user to generate the encryption key. In yet another embodiment, the client device authenticates a user account with an authentication service 110, and the authentication service 110 sends one or more encryption keys 154 associated with the user account and/or the image.

The client application 142 can generate an encrypted image by transforming the image, encrypting the transformed image, and inversing the transformation of the image. The client application 142 can use a transformation algorithm to transform the image, an encryption algorithm to encrypt the image, and an inverse transformation algorithm to inverse the transformation. The client application 142 can send the encrypted image to be stored in a cloud storage. For example, the client application 142 can send the encrypted image to the receive service 118. The receive service 118 can store the encrypted image in cloud storage 106 as an image 139.

In some embodiments, the receive service 118 pushes the encrypted image into the queue 133. In another embodiment, the receive service 118 can send the encrypted image to the encryption service 127 through a firewall 121. In yet another embodiment, the receive service 119 can store the encrypted image as image 136 or 139.

The encryption service 127 can decrypt the encrypted image or push the encrypted image into the queue for subsequent decryption. The encryption service 127 can be one or more parallel encryption and/or decryption servers executed in a cloud computing resource. The firewall 121 can isolate the encryption service 127 from outside access through network 115, for example, to prevent access to the image after decryption. An encrypted file can be transmitted and received on one side of the firewall 121 in an encrypted form and transformed and encrypted or decrypted on the other side of the firewall 121.

The encryption service 127 can pop encrypted images from the queue 133. The queue 133 can provide the encrypted images in a first-in first-out (FIFO) order, a last-in first-out (LIFO) order, or a priority-based order to the encryption service 127. The encryption service 127 can query the authentication service 110 for an encryption key 154 corresponding to an encrypted image.

The encryption service 127 can transform the encrypted image using a transformation algorithm. The transformed image can be decrypted by the encryption service 127 using a decryption algorithm. The encryption service 127 can transform the decrypted image back into the image using an inverse transform algorithm. The encryption service 127 can store the decrypted image as an image 136 or 139.

In one embodiment, images can be transmitted over the network 115 in an unencrypted format, and encrypted before being stored in a cloud storage 106. When a client application 142 requests an image from the receive service 118, the encryption service 127 can retrieve the image in an encrypted form from the cloud storage 106 and decrypt the image. The receive service 118 can send the image to the client application 142 in response to the request. In another embodiment, the encrypted image retrieved from the cloud storage 106 is sent by the receive service 118 without being decrypted. In this embodiment, the client application 142 can decrypt the encrypted image.

The computing environment 103 can communicate via the network 112 with the cloud storage 106. For example, computing environment 103 can store an image in the cloud storage 106 by transmitting the image over the network 112. As another example, the computing environment 103 can receive an image from the cloud storage 106 via the network 112. Similarly, the computing environment 103 can communicate with client devices 109 via the network 115. In some embodiments, the network 112 is a private local area network (LAN) and the network 115 is a public wide area network (WAN). The networks 112 and 115 can be separated by the firewall 121. In one embodiment, the network 112 and the network 115 are the same network.

The authentication service 110 can receive encryption keys from a computing environment 103 and a client device 109. The authentication service 110 can store the encryption key associated with a user account and/or one or more images. As an example, the authentication service 110 can receive an encryption key from a user account "John Smith" that was used to encrypt a set of ten images. The encryption key can be stored in association with "John Smith" user account in addition to being individually associated with each of the ten images.

A task application 124 can be used to perform tasks on encrypted images stored in images 139 cloud storage 106. The tasks performed by the task application 124 may be resource intensive, such that performance by a client device 109 may be impractical. The client application 142 can request an image portraying a specified individual. The specified individual may be associated with one or more reference images that can be compared to other images to identify the specified individual. The task application 124 can fetch images 139 that are stored securely in an encrypted form in cloud storage 106. The encryption services 127 can decrypt the images in parallel. In some embodiments, the task application 124 can request the encryption keys for the images from authentication service 110.

The task application 124 can determine whether the specified individual is located within the image based on one or more reference images. The task application 124 can send the images that the specified individual appears to the client application 142. In another example, the task application 124 can search for cancerous tumors in encrypted images stored in a cloud storage 106 and return any positive results for further inspection on a client device.

Figure 2:
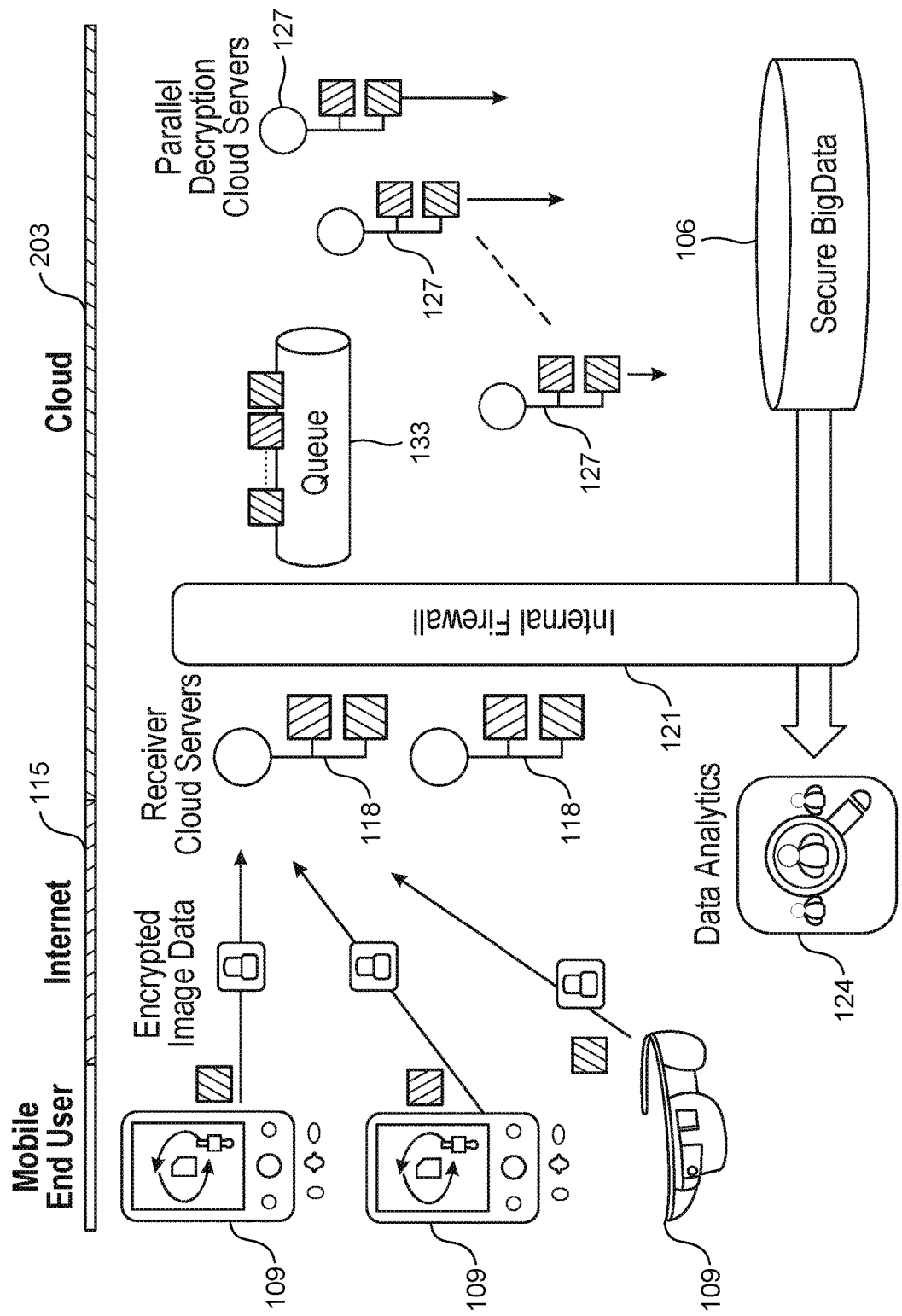
FIG. 2 is a drawing of a network environment having mobile end user devices and a cloud based file storage system in the networked environment according to various example embodiments.

With reference to FIG. 2, shown is a drawing of an example embodiment of the secure data transmission and storage system. In particular, FIG. 2 is a drawing of a networked environment 100 having mobile end user client devices 109 and a cloud based file storage system according to various embodiments of a secure data transmission and storage system disclosed herein. In particular, FIG. 2 shows the secure data transmission between mobile client devices 109 and secure data storage systems, such as cloud storage 106, also referred to as big data storage systems.

Encrypted data or secured data obtained from mobile client devices 109 can reach the cloud storage 106 via the network 115, for example. The receive service 118 at the secure big data storage system cloud 203 end can receive the encrypted data after authenticating the owner of data. The receive service 118 can send the data inside the actual storage environment. After passing through the firewall 121, the data can be decrypted by the encryption service 127 and sent to be stored in cloud storage 106. The data stored in the system then can be used for data analysis or data processing in the task application 124.

Figure 3:
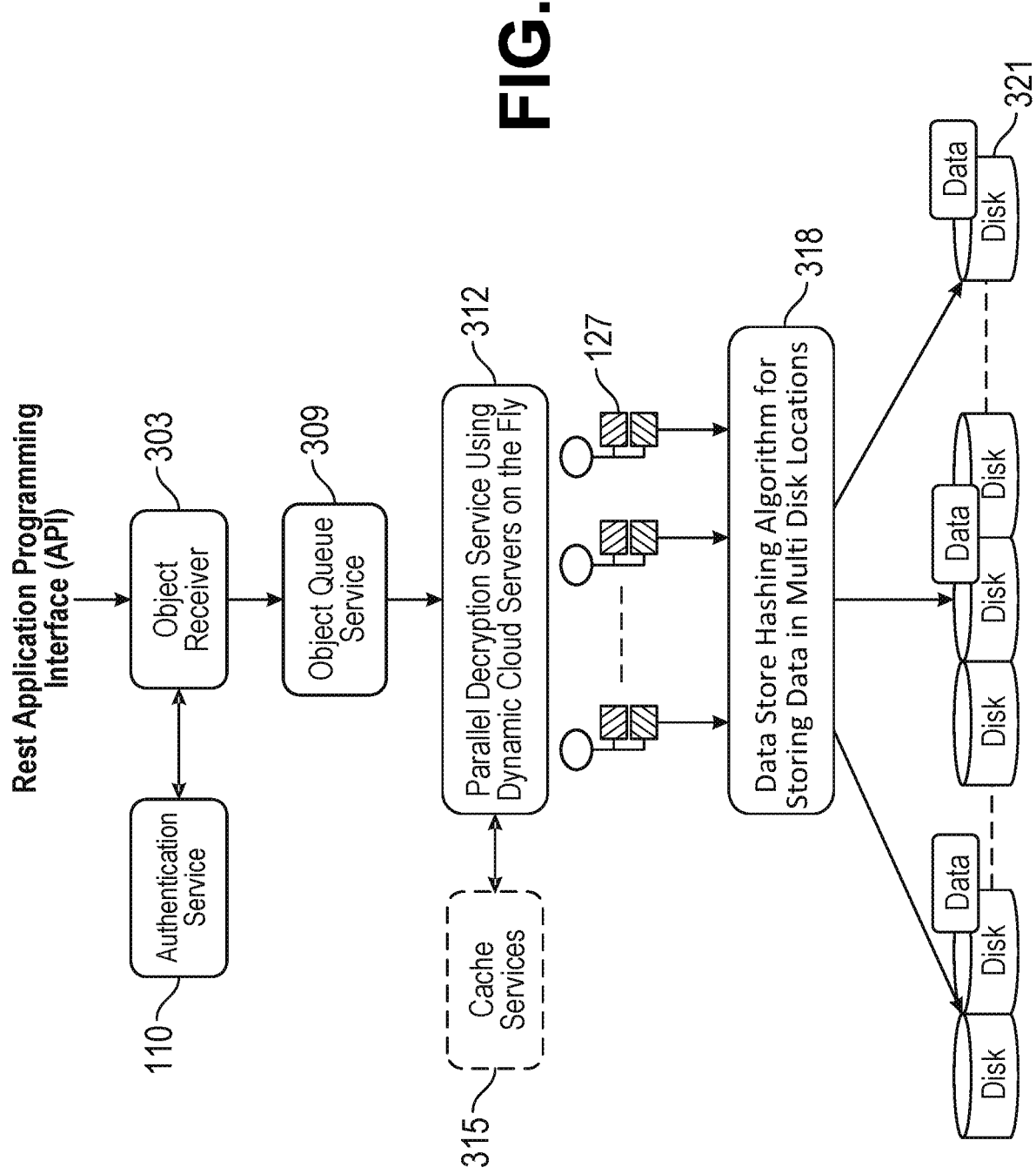
FIG. 3 is an overview of an embodiment of the networked environment according to various example embodiments.

With reference to FIG. 3, shown is a high level view of secure big data storage system with parallel decryption service in networked environment 100. The networked environment 100 can include an object receiver 303, an authentication service 110, an object queue service 309, a parallel decryption service 312, a cache service 315, and hashing service 318, and a cloud storage devices 321. The object receiver 303 can be implemented as a portion of the receive service 118. The authentication service 306 can be an authentication service 110. The object queue service 309 can push and pop objects from queue 133. The parallel decryption service can spawn the encryption services 127 using dynamic cloud servers on the fly. The cloud storage devices 321 can be part of a cloud storage 106.

With the help of the API, the client devices 109 can communicate with the secure sharing environment, such as computing environment 103 and cloud storage 106. Once an encrypted object, for example an encrypted file or image, reaches the computing environment 103, the object receiver 303 can receive the object, and the authentication service 110 can facilitate authenticating the owner of the object. As an example, the authentication service can authenticate a user account associated with the client device 109 that transmitted the encrypted object.

The encrypted object can pass through the object queuing service 309 before entering the parallel decryption service 312. The parallel decryption service 312 can decrypt multiple encrypted objects in parallel. The parallel decryption service 312 layer is capable of dynamically spawning cloud servers that can execute the encryption services 127 based on the demand and resource load. As an example, the parallel decryption service 312 can calculate a utilization metric for each cloud server.

The parallel decryption service 312 can calculate an overall utilization score based on the utilization metrics for the cloud servers. If the overall utilization score meets a predefined threshold, the parallel decryption service 312 can spawn or allocate additional cloud servers to execute encryption services 127. If a utilization metric for one of the cloud servers meets a predefined threshold, the parallel decryption service 312 can perform load balancing by reducing the rate objects are assigned for processing to the cloud server that meets the threshold and any encryption services 127 executed by the cloud server that meets the threshold. After the object is decrypted, a hashing algorithm controller 321 can decide where the object is to be stored. The object can be stored in a location within one of the cloud storage devices 321.

Figure 4:
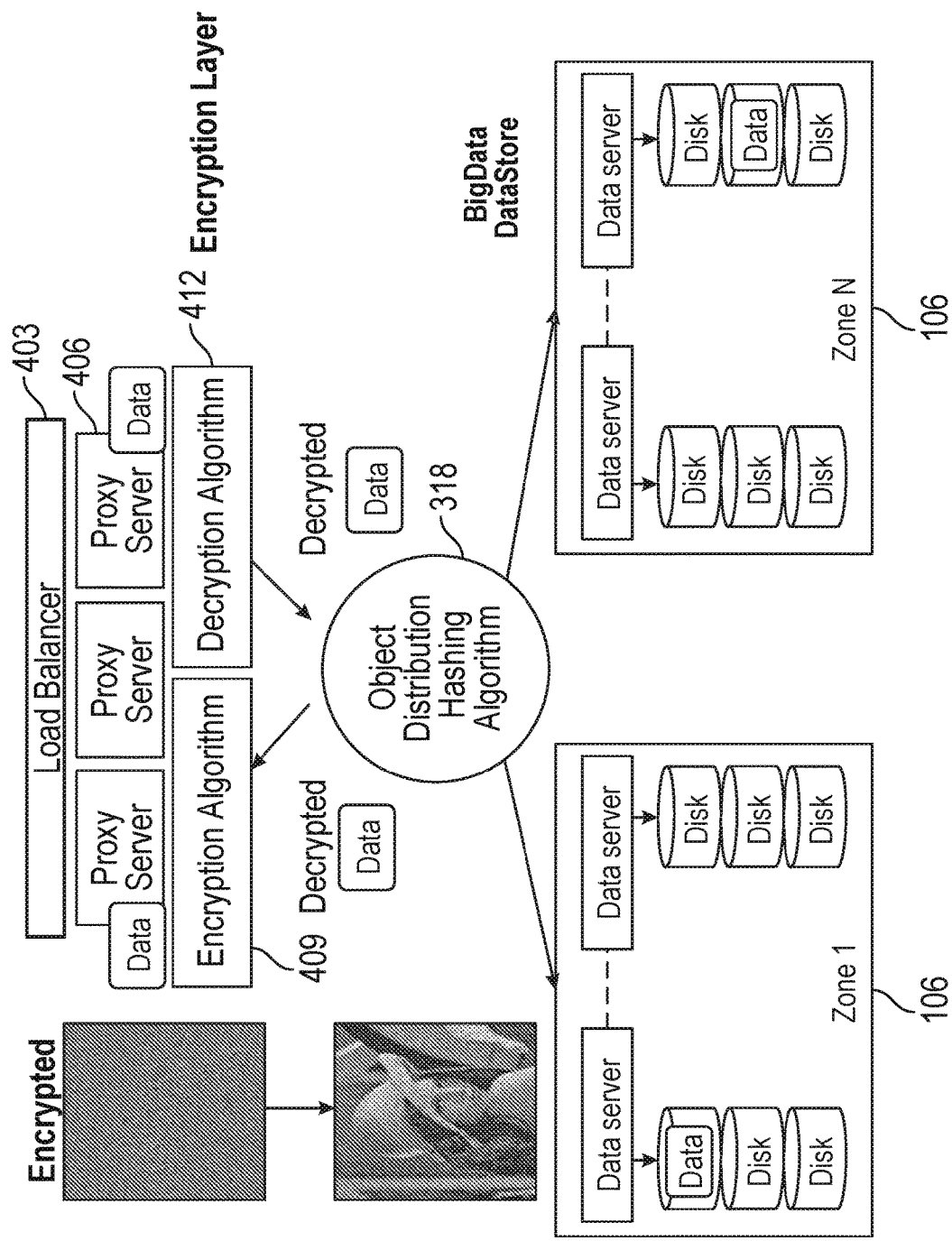
FIG. 4 shows a sub-system of an embodiment of the networked environment according to various example embodiments.

Turning to FIG. 4, shown is an overview of the storage mechanism of embodiments of the present disclosure. The architectural components can be broken into two main categories, a secure proxy service and a storage mechanism. The receive service 118 in conjunction with the firewall 121 and encryption service 127 can operate as the secure proxy service layer (SPS layer). The storage mechanism can be the cloud storage 106. The load balancer 403 and proxy server 406 can be implemented in the receive service 118 and the queue 133.

Figure 7:
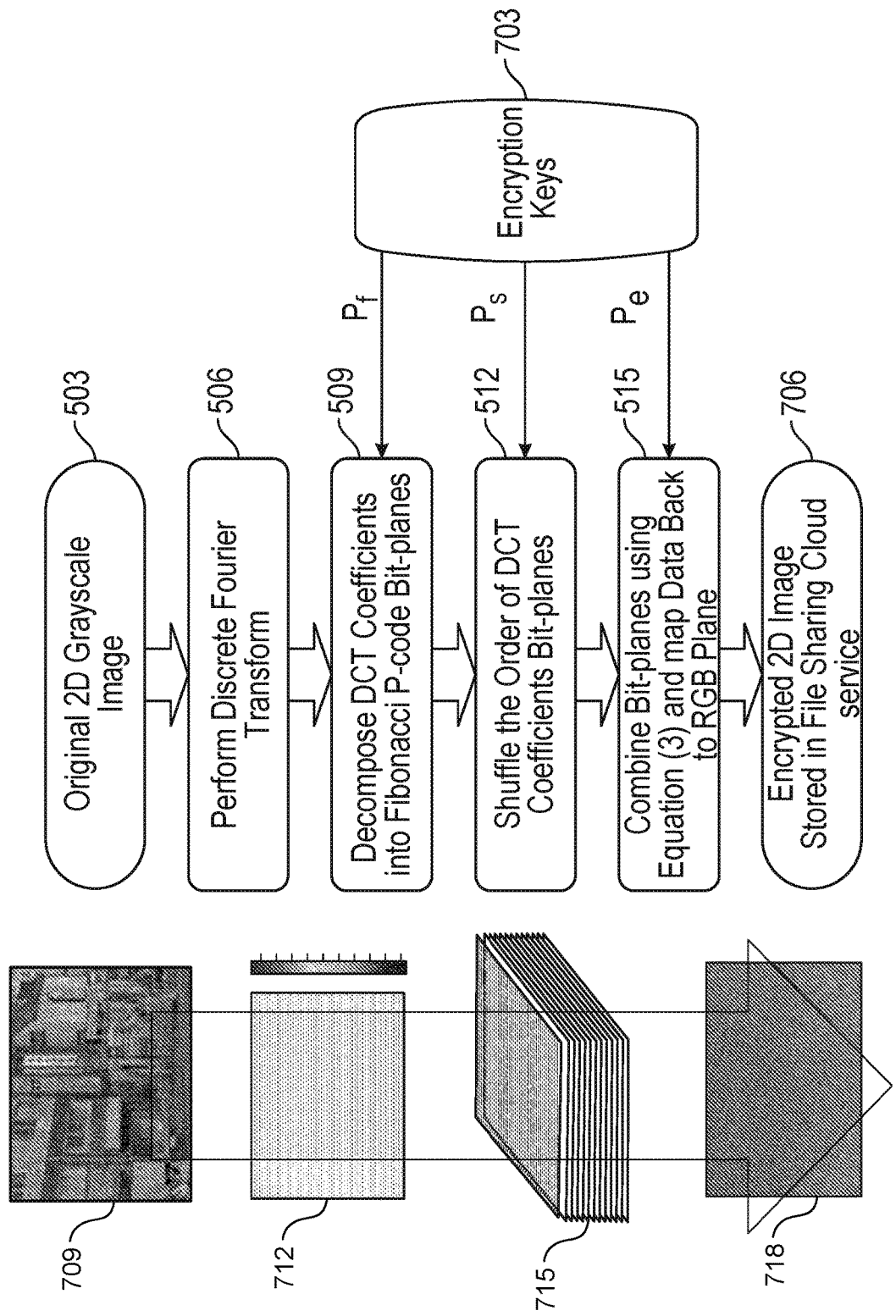

The receive service 118 can communicate with the user or consumer on client devices 109 to send and receive encrypted data and transmit the encrypted data. The SPS layer can include proxy servers 406 with encryption services 127 that operate encryption algorithm 409 and decryption algorithm 412. P-Fibonacci transform of Discrete Cosine Coefficients (PFCC), as shown in FIG. 7, is an example of an encryption/decryption algorithm that can be used in the encryption service 127. Another example of an encryption/decryption algorithm is one performed using the fast Fourier transformation conjugate complex property of an image. A load balancer 403 can facilitate in distributing the load between different proxy servers 406.

The data store hashing algorithm relates to the mapping between actual data and a corresponding physical location. For example, one such implementation can be found in Openstack Swift. Swift uses a hashing algorithm called a ring. A ring represents mapping between names of images stored in a disk and their physical location. Swift uses three such rings for a storage mechanism. For maintaining the ring hashing algorithm, a controller is used, for example, as part of the cloud storage 106. In swift, the rings are maintained or controlled by a ring controller. The role of the ring controller is essentially to make sure that the correct ring is used as its member element.

The cloud storage 106 can be configured to obtain a decrypted image from the encryption service 118 and store the decrypted image in a secure big data storage system as images 139. This cloud storage 106 can comprise a number of servers for storing the data, and these servers can be in different racks or zones or even geographical locations. Storing data in different sets of storage servers can facilitate providing data redundancy to the system.

The computing device 106 can be responsible for tying together the rest of the architecture. For each request, the receive service 118, task application 124, or encryption service 127 can look up the location of the object/data using the hashing algorithm 318 and route the request accordingly. The public API can be exposed through the receive service 118.

For every encrypted object/data received from a client device 109, the encryption service 127 performs decryption through encryption algorithm 409 and decryption algorithm 412 and routes the decrypted data to a storage location based on the hashing algorithm implemented in the hashing service 318. Similarly for every image requested by the user on a client device 109, a route to a storage location in the cloud storage 106 can be determined through the hashing algorithm and can be sent out after encryption using the encryption service 127.

A large number of failures are also handled in the proxy server 406. When objects are streamed to or from a receive service 118, the objects can be streamed directly through the proxy server 406 and the SPS layer to or from the user on a client device 109. In some embodiments, the proxy server 406 or SPS layer does not spool the objects.

Figure 5:
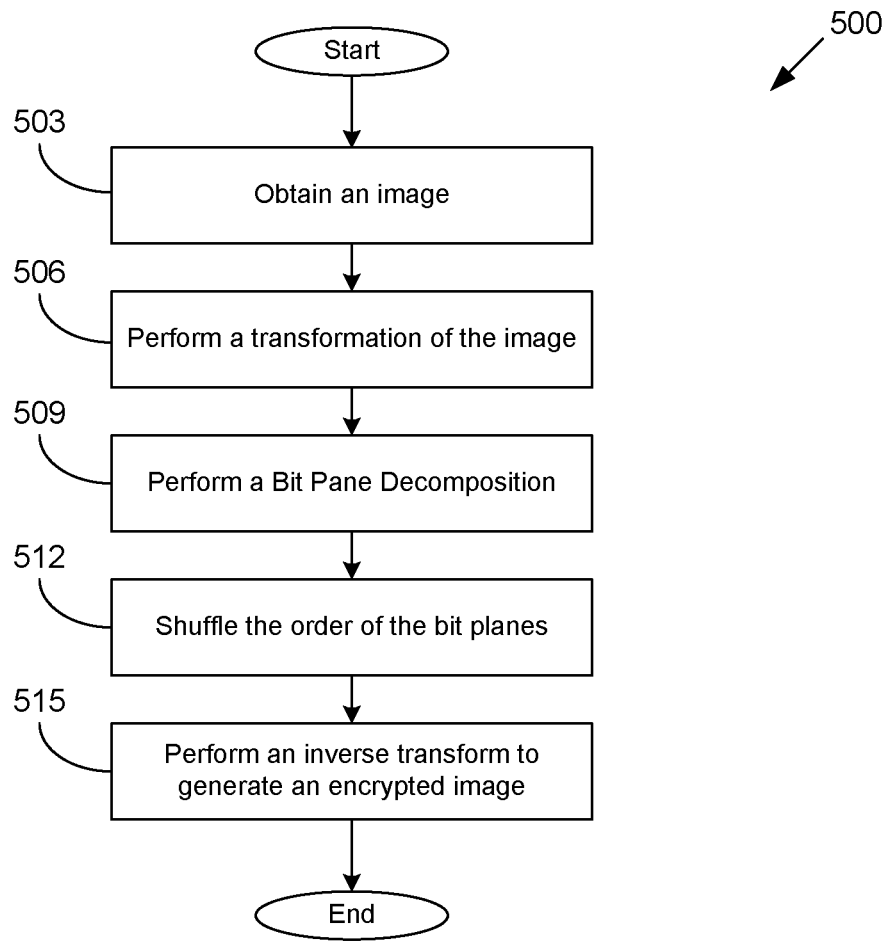
FIGS. 5-7 are flowcharts providing one example of the operation of various embodiments of the networked environment.
Figure 6:
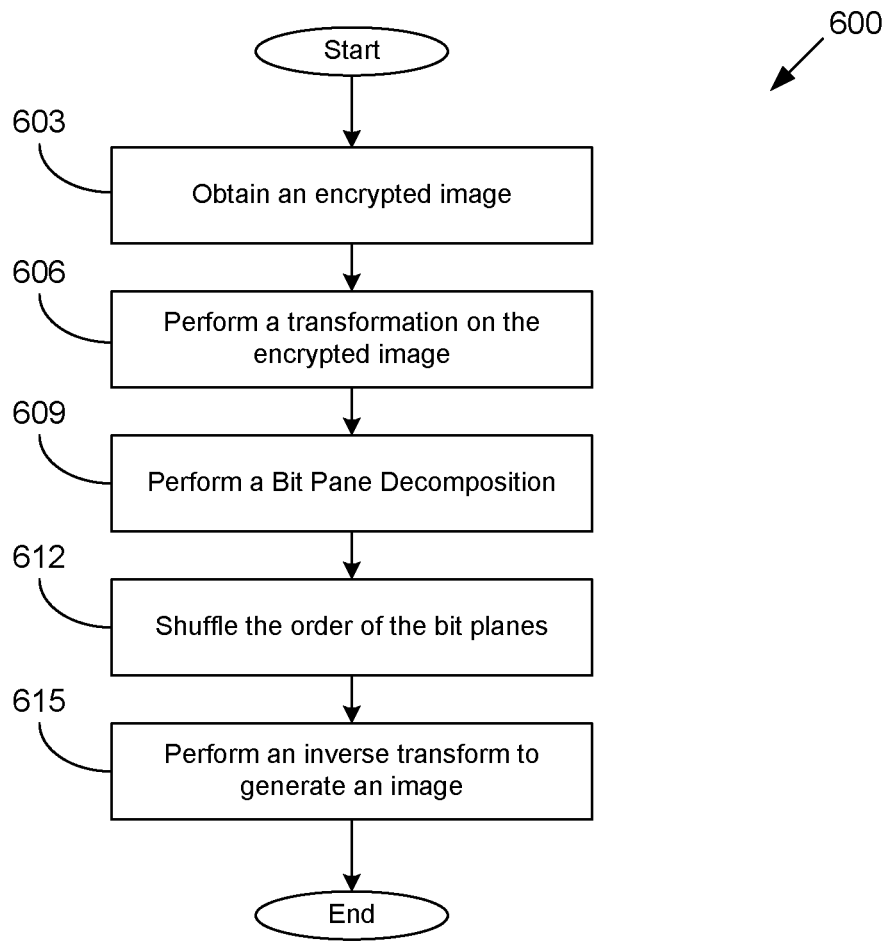

Before turning to the process flow diagrams of FIGS. 5-7, it is noted that embodiments described herein may be practiced using an alternative order of the steps illustrated in FIGS. 5-7. That is, the process flows illustrated in FIGS. 5-7 are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope and spirit of the embodiments.

Referring to FIG. 5, depicted is an image securing operation based on transforming and encrypting an image. The image securing operation can be performed as a portion of the encryption service 127 or client application 142. It is understood that the flowchart of FIG. 5 provides merely an example of the many different types of functional arrangements that may be employed to implement the operation of the portion of the encryption service 127 or client application 142 as described herein. As an alternative, the flowchart of FIG. 5 can be viewed as depicting an example of steps of a method implemented in the computing environment 103 or client device 109 according to one or more embodiments.

In box 503, the image securing operation 500 can include obtaining an image. In one embodiment, a client application 142 can obtain an image by loading the image from a local storage device, taking a picture using a camera associated with the client device 109, or loading the image from another source. The client application 142 can receive the image from another client device 109, for example through a text message or email. A receive service 118 or encryption service 127 can receive the image from a cloud storage 106 via a secured network 112.

In box 506, the image securing operation 500 can perform a transformation of the image. The encryption service 127 or client application 142 can perform a transformation on the image, such as a Fourier transform. The transformation can be a cosine transform, a sine transform, or another type of transform. The transformed image can be stored in memory for further processing. In one embodiment, the image is transformed by a parallel encryption service 127 in the computing environment 103. The transformation can convert the image from a spatial domain to the frequency domain.

In box 509, the image securing operation 500 can include performing a bit-plane decomposition on the transformed image. The encryption service 127 or client application 142 can decompose the transformed image into more than one bit-planes. The bit-planes can be generated by decomposing DCT coefficients into Fibonacci P-code bit-planes. In some embodiments, an encryption key is used when generating the bit-planes.

In box 512, the image securing operation 500 can include shuffling the order of the bit-planes. The encryption service 127 or client application 142 can perform the shuffling of the bit-planes. The shuffling order can be randomly chosen by the encryption service 127 or client application 142 or specified by a user. The order can be obtained from or stored as part of an encryption key corresponding to the image being secured.

In box 515, the image securing operation 500 can include transforming the shuffled bit-planes back into an RGB plane. The shuffled bit-planes can be transformed again to generate an encrypted image. The encryption service 127 or client application 142 can perform another transformation on the shuffled bit-planes. The transformation can convert the shuffled bit-planes from the frequency domain back to the spatial domain to generate the encrypted image.

When an image is encrypted, the encryption service 127 can return to box 503 to encrypt a second image from queue 133 using a second encryption key. Additionally, the client application 142 can also return to box 503 after an image is encrypted to encrypt a second image using a second encryption key. In some embodiments, the first encryption key is reused for subsequent images. In one embodiment, the encryption service 127 and client application 142 can iterate over multiple images to generate multiple encrypted images.

With reference to FIG. 6, depicted is an image unsecuring operation 600 based on transforming and decrypting an encrypted image. The image unsecuring operation 600 can use the same encryption key as used when encrypting an image to decrypt the image. As an example, an image encrypted using the image securing operation 500 in FIG. 5 with one or more encryption key can be decrypted using the image unsecuring operation 600 using the same one or more encryption key. The image unsecuring operation 600 can be performed as a portion of the encryption service 127 or client application 142.

It is understood that the flowchart of FIG. 6 provides merely an example of the many different types of functional arrangements that may be employed to implement the operation of the portion of the encryption service 127 or client application 142 as described herein. As an alternative, the flowchart of FIG. 6 can be viewed as depicting an example of steps of a method implemented in the computing environment 103 or client device 106 according to one or more embodiments.

According to one embodiment, FIG. 6 explains a corresponding decryption method for the encryption method of FIG. 5, such as a PFCC encryption method. In fact, the decryption process is similar to the encryption process shown in FIG. 5 but backwards.

In box 603, the image unsecuring operation 600 can obtain an encrypted image. The receive service 118 can receive an encrypted image from a client application 142, or vice versa. In one embodiment, the client application 142 receives the encrypted image from the receive service 118 after the computing environment 103 loads the encrypted image from a cloud storage 106. In another embodiment, the image is stored on the cloud storage unencrypted, and the computing environment 103 encrypts the image prior to transmitting the image to the client device 109 over an unsecured network 115.

In box 606, the image unsecuring operation 600 can perform a transformation of the image. The encryption service 127 or client application 142 can perform a transformation on the encrypted image, for example, Fourier transform. The transformation algorithm first maps encrypted RGB image data back into an original range. The transformation can be a cosine transform, a sine transform, or another type of transform. The transformed image can be stored in memory for further processing. In one embodiment, the image is transformed by a parallel encryption service 127 in the computing environment 103. The transformation can convert the image from a spatial domain to the frequency domain.

In box 609, the image unsecuring operation 600 can include performing a bit-plane decomposition on the transformed image. The encryption service 127 or client application 142 can decompose the transformed image into more than one bit-planes. The image can be decomposed into the binary bit-planes of the image. The bit-planes can be generated by decomposing DCT coefficients into Fibonacci P-code bit-planes. In some embodiments, an encryption key used when encrypting the file is needed to perform the bit-plane decomposition.

In box 612, the image unsecuring operation 600 can include shuffling the order of the bit-planes. The encryption service 127 or client application 142 can perform the shuffling of the bit-planes. The shuffling order can be based on a shuffling order used when encrypting the image. As an example, the order of all bit-planes can be reverted to an original order. The order can be obtained from the encryption key corresponding to the image being secured.

In box 615, the image unsecuring operation 600 can include transforming the shuffled bit-planes to generate the original image. The encryption service 127 or client application 142 can perform another transformation on the shuffled bit-planes. The transformation can convert the shuffled bit-planes from the frequency domain back to the spatial domain. The bit-planes can be packed together and an inverse transform can be calculated to obtain the reconstructed image.

With reference to FIG. 7, shown is an example embodiment of the image securing operation based on transforming and encrypting an image using a PFCC encryption method, as shown in FIG. 5. The image securing operation can be completed with encryption keys 703. The encryption keys 703 can be obtained from a remote server, such as the authentication service 110.

The encryption service 127 can decompose DCT coefficients of the transformed image into Fibonacci P-code bit-planes based on a first encryption key, shuffle an order of the bit-planes based on a second encryption key, and combine the shuffled bit-planes based on a third encryption key. The encryption service 127 can also map the combined bit-planes to an RGB plane to generate an encrypted image.

The encryption keys 703 can include multiple keys, such as $P_f$, $P_S$, and $P_e$. Each of the keys can be used for a different step of the encryption process. As an example, a first encryption key 703 can be used for decomposing the bit-planes in 509, a second encryption key 703 can be used for shuffling the order of the bit-planes in 512, and a third encryption key 703 can be used for combining the bit-planes and mapping back to an RGB plane. The encrypted 2D image can be stored in cloud storage 106 in step 706, such as according to hashing algorithm.

Images 709, 712, and 718 and bit-planes 715 illustrate an example of the encryption algorithm being applied to an image 709. Image 709 shows an original image obtained in 503. After the discrete Fourier transform algorithm is performed on the image to generate a transformed image in step 506, the transformed image 712 is encrypted by decomposing the DCT coefficients with a first encryption key 703 $P_f$ to generate the bit-planes 715. The order of the bit-planes 715 are shuffled using a second encryption key 703 $P_S$. The bit-planes 715 are combined using a third encryption key 703 to generate the encrypted image 718.

PFCC is an example encryption and decryption algorithm for the SPS layer. The encryption and decryption algorithms can include a transform algorithm component and an encryption/decryption algorithm component. In one embodiment, steps 506 and 515 are referred to as a transformation algorithm, while steps 509 and 512 are referred to as an encryption algorithm.

PFCC can be based on Discrete Cosine Transform DCT and P-Fibonacci bit-plane decomposition. The DCT transforms an image from the spatial domain to the frequency domain similar to the Discrete Fourier Transform. The 2-D DCT of an image is given by:

$$F(u, v) = \sum_{i=0}^{N-1} \sum_{j=0}^{N-1} f(x, y) \cos\left[\frac{\pi}{N}\left(x + \frac{1}{2}\right)u\right] \cos\left[\frac{\pi}{N}\left(y + \frac{1}{2}\right)v\right] \quad (1)$$

While u,v=0,1,2, . . . ,N−1 in equation 1.

The obvious distinction between a DCT and a DFT is that the former uses only cosine functions. However, this visible difference is merely a consequence of a deeper distinction; since a DCT implies different boundary conditions than the DFT or other related transforms. The inverse Discrete Cosine Transform IDCT is given by:

$$f(x, y) = \emptyset(N) \sum_{i=0}^{N-1} \sum_{j=0}^{N-1} F(u, v) \cos\left[\frac{\pi}{N}\left(u + \frac{1}{2}\right)x\right] \cos\left[\frac{\pi}{N}\left(v + \frac{1}{2}\right)y\right] \quad (2)$$

While x,y=0,1,2, . . . ,N−1 in equation 2. Image transformation can remove the redundancy between neighboring pixels. Removing the redundancy can lead to uncorrelated transform coefficients which can be encoded independently.

The significance of a transformation scheme can be directly measured by its ability to bundle input data into as few coefficients as possible. This allows the encryption service to discard coefficients with relatively small amplitudes without introducing visual distortion in the reconstructed image. DCT exhibits excellent energy compaction for highly correlated images.

With reference to FIG. 8, shown is the DCT of an image. The image energy can be condensed into the low frequency region. As an example, a 512×512 original image 803 can be reduced to a 128×128 image 809 through a DCT transform process. The computing environment 103 or client device 109 can perform a DCT transform on an image to generate a transformed image. A subset of the transformed image 806 can be selected for an inverse DCT (IDCT) transform to generate a lower resolution image 809.

The client device 109 can determine an image quality threshold value based on characteristics of an image. For example, the client device 109 can determine a mean square error, a signal to noise ratio, and a Bovik index for a reduced resolution image 809 in comparison to the image 803. The client device 109 can determine an image quality threshold value required for the reduced resolution image 809. As an example, the client device 109 can be configured with a predetermined image quality threshold value. The computing environment 103 can send a message to update the image quality threshold in a client device 109. The image quality threshold can be based on an available bandwidth of an internet connection for the client device. For example, if a slow speed bandwidth is available, a lower quality image can be used to improve transfer times.

The image quality threshold can be a range of values. In one embodiment, more than one subset of the transformed image 806 can be processed with an IDCT transform to find an image resolution that falls within a range of the values. In another embodiment, an IDCT transform can be applied to subsets of the transformed image 806 to minimize the image resolution while meeting the image quality threshold.

The P-Fibonacci sequence is a recursive sequence defined by:

$$F_p(n) \begin{cases} 0 & n < 0 \\ 1 & n = 0 \\ F_p(n-1) + F_p(n-p-1) & n > 0 \end{cases} \quad (3)$$

Based on the definition in equation 3, the P-Fibonacci sequence changes with different p values. Some examples are given in Table 1. Note that the P-Fibonacci sequence can derive the power of two series (P=0) and traditional Fibonacci number (P=1).

TABLE 1

P-Fibonacci sequences with different p values

| P | 0 | 1 | 2 | 3 | 4 | 5 | 6 | 7 | ... |
|---|---|---|---|---|---|---|---|---|-----|
| 0 | 1 | 2 | 4 | 8 | 16 | 32 | 64 | 128 | ... |
| 1 | 1 | 2 | 3 | 5 | 8 | 13 | 21 | 34 | ... |
| 2 | 1 | 2 | 3 | 4 | 6 | 9 | 13 | 19 | ... |
| 3 | 1 | 2 | 3 | 4 | 5 | 7 | 10 | 14 | ... |
| 4 | 1 | 2 | 3 | 4 | 5 | 6 | 8 | 11 | ... |
| ∞ | 1 | 1 | 1 | 1 | 1 | 1 | 1 | 1 | ... |

According to Zeckendorf's theorem, a non-negative decimal number can be represented uniquely as a sum of non-adjacent elements since the power of two series is a special case of the P-Fibonacci sequence; this is called a legal decomposition. Therefore, a non-negative decimal number 1 can be represented by the following format:

$$I = \sum_{i=0}^{n-1} c_i f_p(i) = c_0 f_p(0) + c_1 f_p(1) \ldots + c_{n-1} f_p(n-1) \quad (4)$$

This sequence for Fibonacci numbers smaller than 255 are highlighted in the table shown below:

TABLE 2

Bit-Planes Fibonacci representation for gray scale image

| Index | Fibonacci Number | 12 Bit-Planes Presentation |
|-------|------------------|----------------------------|
| 1 | 1 | 1 |
| 2 | 2 | 10 |
| 3 | 3 | 100 |
| 4 | 5 | 1000 |
| 5 | 8 | 10000 |
| 6 | 13 | 100000 |
| 7 | 21 | 1000000 |
| 8 | 34 | 10000000 |
| 9 | 55 | 100000000 |
| 10 | 89 | 1000000000 |
| 11 | 144 | 10000000000 |
| 12 | 233 | 100000000000 |

Figure 9:
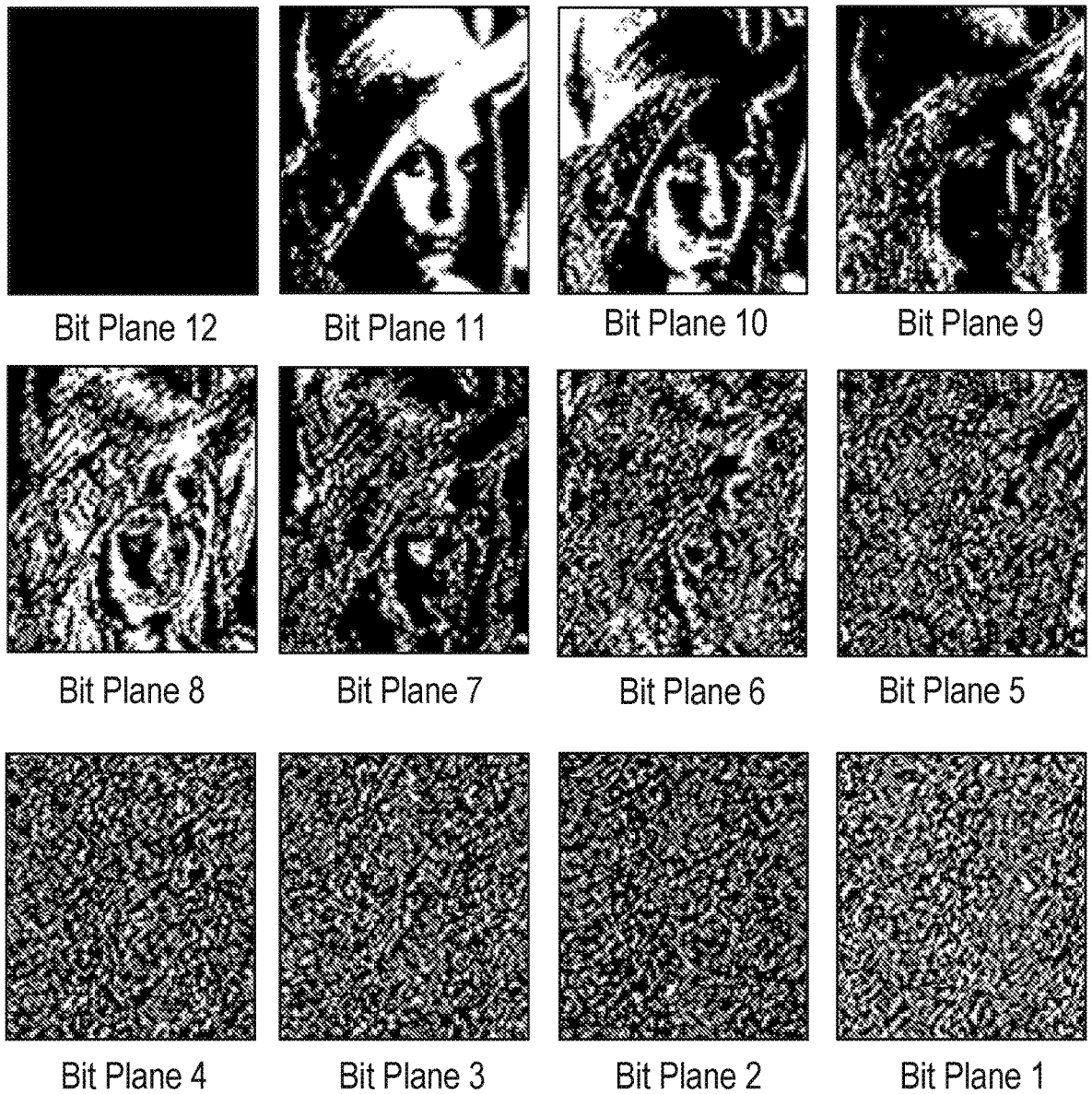
FIG. 9 shows an example of a Fibonacci P-code decomposition in 12 bit-planes as implemented by the networked environment according to various example embodiments.

A grayscale image can be decomposed into 1-bit binary bit-planes 715 presented in Table 2. For an 8-bits gray scale image, the maximum pixel value is about (i,j)=255. As a result, each pixel can be represented by Fibonacci P-code decomposition in 12 bit-planes or more. Each bit will then be assigned to the correspondent bit-plane presented in FIG. 9. FIG. 9 shows an example of a Fibonacci P-code decomposition in 12 bit-planes as implemented in the networked environment 100.

For a specific grayscale image, the results of the Fibonacci P-code bit-plane decomposition can be parameter dependent. The number of the Fibonacci P-code bit-planes changes with parameter p values. Moreover, the contents of the Fibonacci P-code bit-planes can be different based on different p values, making the Fibonacci P-code bit-plane decomposition well suitable for image encryption. This bit-plane decomposition can be used in image compression and enhancement. However, the corresponding decomposition results and the number of bit-planes can be unchangeable for a specific grayscale image and easy to predict. This is not conducive for image encryption.

The PFCC encryption/decryption algorithms shown in FIGS. 5-7 contain four processes: image decomposition, bit-plane shuffling, bit-plane encryption and bit-plane mapping to RGB plane. In order to store an encrypted image in cloud file-sharing environment, the encryption service 127 can first compute the DCT coefficients of the image as a matrix of I_max (N,N). Next, the encryption service 127 can compute the Fibonacci P-code decomposition in 24 bit-planes of the DCT coefficient values ⟦ F_max (N⟧ ^2×N^2) described by equation 4. Finally, the encryption service 127 can map the 24 bit-planes to encrypted RGB planes using a private security key, such as an encryption key 154. This example encryption method illustrates the dual encryption method conducted by the proxy service using P-Fibonacci Transformation of DCT Coefficient and private keys. To recover the original image from the encrypted image, the authorized users will be provided the security keys.

The hashing service 318 can be configured to determine where data should reside in the cluster. When other components need to perform any operation on an object, the components need to interact with hashing service 318 to determine the object location in the cluster. The hashing service 318 can use a hashing algorithm to maintain a mapping using zones, devices, partitions, and replicas, which is similar to OpenStack Swift Ring algorithm.

A device or node is a machine that is running one or more processes. When there are multiple nodes running that provide all the processes needed for a system to act as a distributed storage system, the nodes are considered to be a cluster in a cloud storage 106. A configurable value in the hashing algorithm can be the replica count. For a given partition number, each replica device may not be in the same zone as any other replica's device. Zones can be used to group devices based on physical locations, power separations, network separations, or any other attribute that would lessen multiple replicas being unavailable at the same time.

The hashing algorithm can also be responsible for determining which devices are used for handoff in failure scenarios. The replicas of each partition will be isolated onto as many distinct regions, zones, servers and devices as the capacity of these failure domains allow. If there are less failure domains at a given tier than replicas of the partition assigned within a tier (e.g. a 3 replica cluster with 2 servers), or the available capacity across the failure domains within a tier are not well balanced, it may not be possible to achieve both even capacity distribution (balance) as well as complete isolation of replicas across failure domains (dispersion).

Data can be evenly distributed across the capacity available in the cluster of cloud storage 106 by the weight of the device. Weights can be used to balance the distribution of partitions on drives across the cluster. For example, weights can be used when different sized drives are used in a cluster. Device weights can also be used when adding or removing capacity to the cloud storage 106 or failure domains to control how many partitions are reassigned during a rebalance to be moved as soon as replication bandwidth allows.

When partitions need to be moved around (for example if a device is added to the cluster), the ring can ensure that a minimum number of partitions are moved at a time, and only one replica of a partition is moved at a time. The hash tables can be built and managed through a hashing service 318 functioning as a hashing algorithm controller. The hashing service 318 can be configured to assign partitions to devices. The server processes just check the modification time of the file occasionally and reload their in-memory copies of the hash structure as needed.

The hashing service 318 can function similarly to OpenStack Swift ring-controller. The ring-controller keeps its own builder file with the ring information and additional data required to build future rings. Multiple backup copies of these builder files should be maintained. One option is to copy the builder files out to every server while copying the ring files themselves. Another is to upload the builder files into the cluster itself. Complete loss of a builder file will mean creating a new ring from scratch, nearly all partitions will end up assigned to different devices, and therefore nearly all data stored will have to be replicated to new locations. So, recovery from a builder file loss is possible, but data will definitely be unreachable for an extended time.

The decrypted data from the parallel decryption algorithm can be stored in a location provided by the hashing algorithm executed by the hashing service 318. Based on the replication, the data is stored in different nodes to provide redundancy to the system.

Replication can keep the system in a consistent state in the face of temporary error conditions like network outages or drive failures. The replication processes can compare local data with each remote copy to ensure they all contain the latest version. Object replication can use a hash list to quickly compare subsections of each partition. For object replication, updating is just a matter of rsyncing files to a peer. A replication can push missing records over HTTP or HTTPS. The replication can also push a whole data base using rsync. The replicator can ensure that data is removed from the system. When an item is deleted, a tombstone is set as the latest version of the item. The replicator can detect the tombstone and ensure that the item is removed from the entire system.

There are times when data cannot be immediately updated. This usually occurs during failure scenarios or periods of high load. If an update fails, the update is queued locally on the file system, and the updater will process the failed updates. This is where an eventual consistency window will most likely come in to play.

One or more auditor service can crawl the local server checking the integrity of data. If corruption is found (in the case of bit rot, for example), the file is quarantined, and replication will replace the bad file from another replica. If other errors are found, the errors are logged.

As described above, discrete Fourier Transform (DFT) is one example of an image processing operation or tool used by the SPS layer, which is used to decompose an image into its sine and cosine components. The output of the transformation can represent the image in the frequency domain, while the input image can represent the spatial domain equivalent. In some embodiments, the DFT does not contain all frequencies forming an image, but the DFT can have enough frequencies to fully describe the spatial domain image. The number of frequencies can correspond to the number of pixels in the spatial domain image. The DFT of an image can be given by:

$$F(k, l) = \sum_{m=0}^{N-1} \sum_{n=0}^{N-1} f(m, n) e^{-j2\pi\left(\frac{km}{N} + \frac{ln}{N}\right)} \quad (5)$$

And the inverse Discrete Fourier Transform (IDFT) can be given by:

$$f(a, b) = \frac{1}{N^2} \sum_{k=0}^{N-1} \sum_{l=0}^{N-1} F(k, l) e^{j2\pi\left(\frac{ka}{N} + \frac{lb}{N}\right)} \quad (6)$$

The output of the Fourier transform can be represented either through two images that represent the real and imaginary part, or two images that represent the magnitude and the phase. The magnitude of the DFT can represent the geometric structure of the spatial image, but in order to recover the original image, both the magnitude and phase of the DFT may be necessary.

The direct calculation of the DFT and the inverse IDFT can be computationally intensive $O(N^2)$. Such a computational complexity can be quite time consuming for mobile or wearable devices, such as client devices 109, because camera resolutions are quickly enhancing, thereby becoming more complex. FFT is a way to compute the same DFT in only $O(N \log N)$ operations. The difference in speed can be enormous, especially for larger image data sets where wearable and mobile camera resolutions are improving.

DFT has a complex conjugate symmetry property. The DFT of a discrete time signal (n, m) can be given by equation 6 shown above. If the input image f(n, m) is a real-valued discrete time signal then the complex conjugate symmetry property of DFT can be:

$$f(N-n, N-m) = f'(n,m) \qquad (7)$$

Where: f' denotes the complex conjugate of (n), while n=0 . . . N−1 and m=0, . . . N−1.

The complex conjugate symmetry property allows us to calculate only half of the DFT while the rest can be computed using the equation 7 shown above.

Random phase encoding technique involves the use of a 2-D random phase mask. f(x, y) indicates the image to be hidden and g(x, y) denotes the encrypted image. For example, exp[j*Ø(x, y)] can stand for the random phase mask represented as the key values. The encryption process can be expressed as:

$$(x,y) = FFT\{f(x,y) * \exp[j * Ø(x,y)]\} \qquad (8)$$

The encrypted image can be dispersed and embedded into a host image to form a combined image. The corresponding decryption process can be expressed as:

$$(x,y) = IFFT\{g(x,y) * \exp[-j * Ø(x,y)]\} \qquad (9)$$

Turning to FIGS. 10A-D, shown are example photographs that show the encryption stages for images. The first row shows the original images. The second row shows the encrypted images. The third row shows the reconstructed images. The image in the third row is identical to the image in the first row, illustrating the lossless nature of the encryption/decryption methods described herein.

Figure 11:
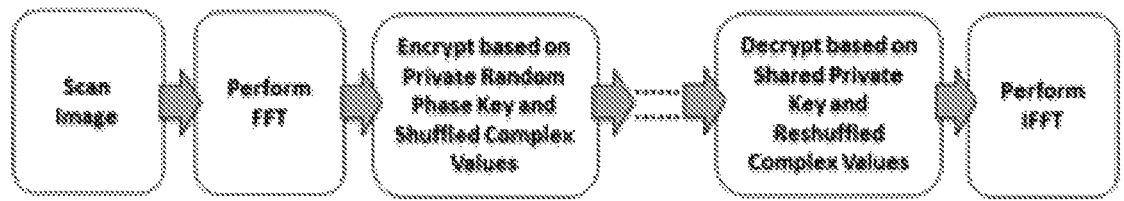
FIGS. 11-13 are flowcharts providing one example of the operation of various embodiments of the networked environment.

With reference to FIG. 11, shown is a flow chart that provides one example of the execution of one embodiment of the secure data transmission and storage system executed in a networked environment 100 according to various embodiments of the present disclosure. The flow chart may also be viewed as depicting a method in accordance with the disclosure. Embodiments of the present disclosure prevent the threat of accessing and tampering of data by an unauthorized entity by encrypting or converting data into a more complex form. The size of the data can also be reduced while preserving the complexity and integrity of the data.

Embodiments of the present disclosure involve encryption methodology based on a random phase key and a complex conjugate property for the image data. One embodiment of a method of encrypting and decrypting data using the complex conjugate symmetry property of the FFT is summarized in the flow chart shown in FIG. 11.

According to some embodiments, to send an encrypted image, the grayscale pixel values of the image are first computed and stored as a matrix of size (N, N). Next, FFT of the grayscale values are computed to obtain only (N/2, N) complex numbers as a result of complex conjugate property described by equation 7. The real and imaginary parts can then be constructed. Following which, the encrypted real and imaginary parts can be combined with a phase key to form an encrypted image. The phase key can be retrieved from an external entity or environment, for example. The private image phase key can be embedded into the encrypted shuffled complex image to form a combined image. The phase encryption process can be expressed, for example, by equation 7.

Figure 12:
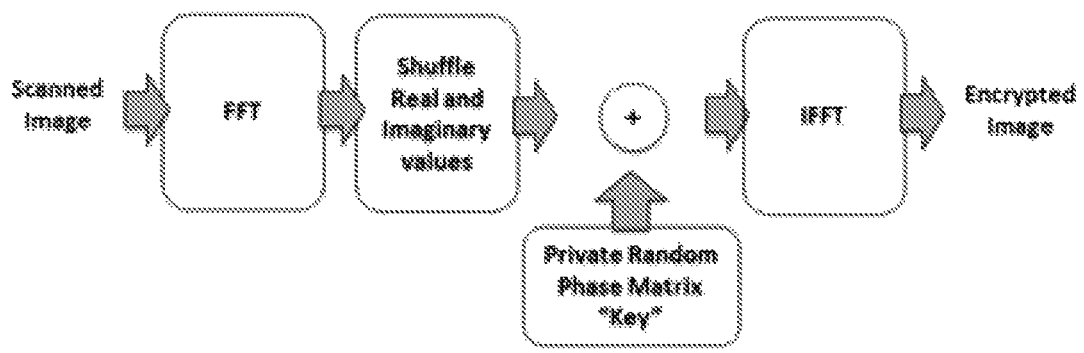

Referring next to FIG. 12, shown is another flow chart that provides one example of the execution of another embodiment secure data transmission and storage system. The flow chart of FIG. 11 shows an example encryption operation using a single random phase method. In the embodiment for encryption shown in the flow chart of FIG. 12, an image can be multiplied by a single random matrix, or "key" exp[j*Ø(x,y)]. The Inverse fast Fourier transformation (IFFT) of the result can be computed to facilitate generating an encrypted image.

The decryption process can be similar to the encryption process but in reverse. The receiver can obtain or scan the image. The receiver can then decrypt and reconstruct the image using the private random phase key that can be received with the image. For example, the private random phase key can be embedded with the image. The receiver can then reshuffle the complex conjugate matrix to obtain the original image. Finally, IFFT can be performed to obtain the original image pixel values. The corresponding decryption process is expressed by equation 9.

Figure 13:
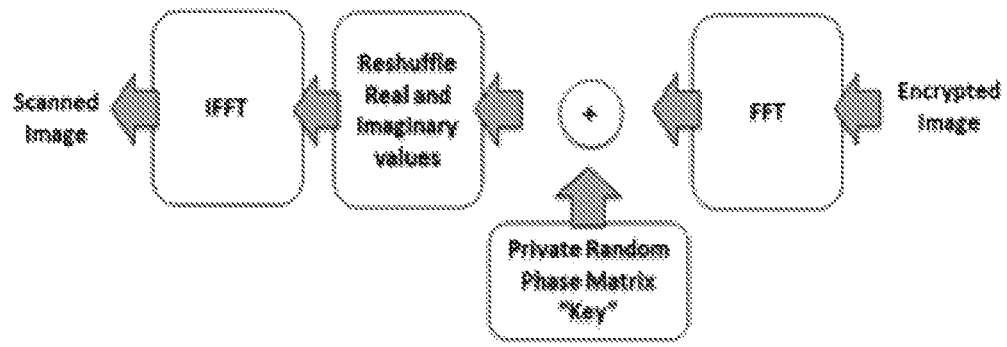
Figure 14A:
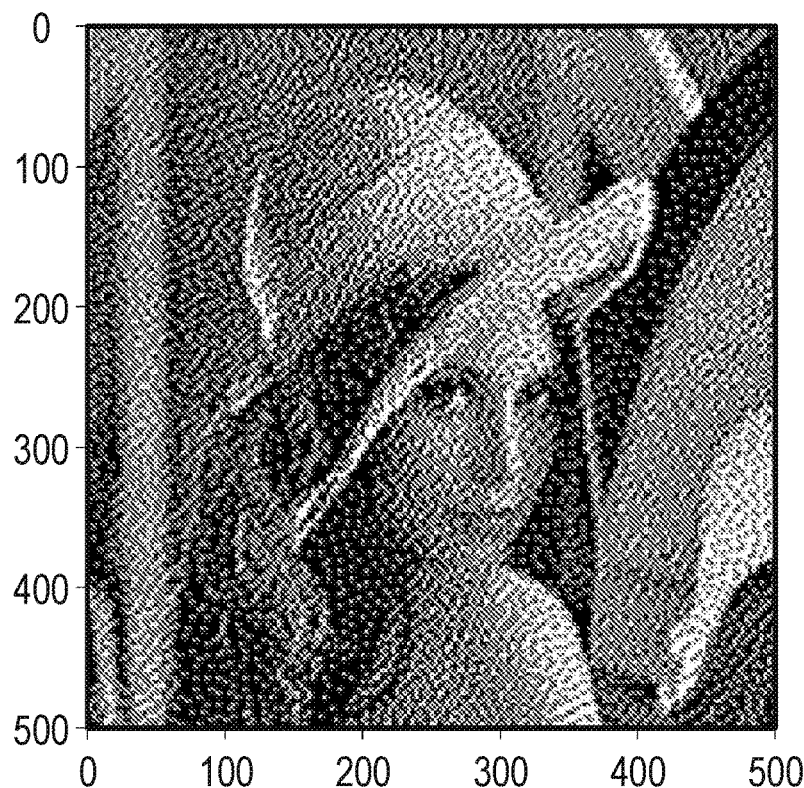
FIGS. 14A-D, 15A-D, and 16A-D are examples of photographs and histograms associated with an original image and an encrypted image generated by an embodiment of the networked environment.
Figure 14B:
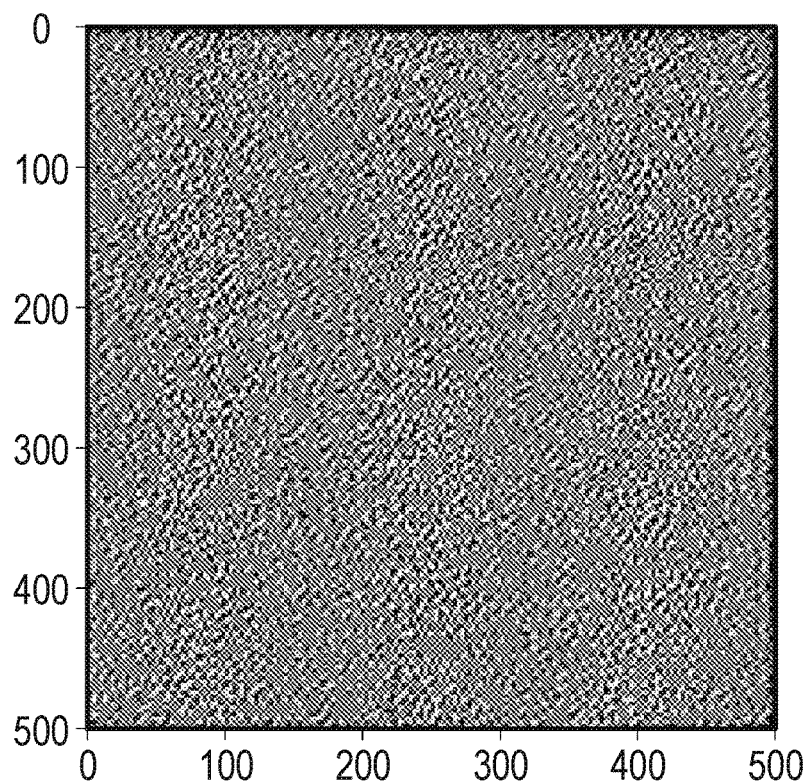
Figure 14C:
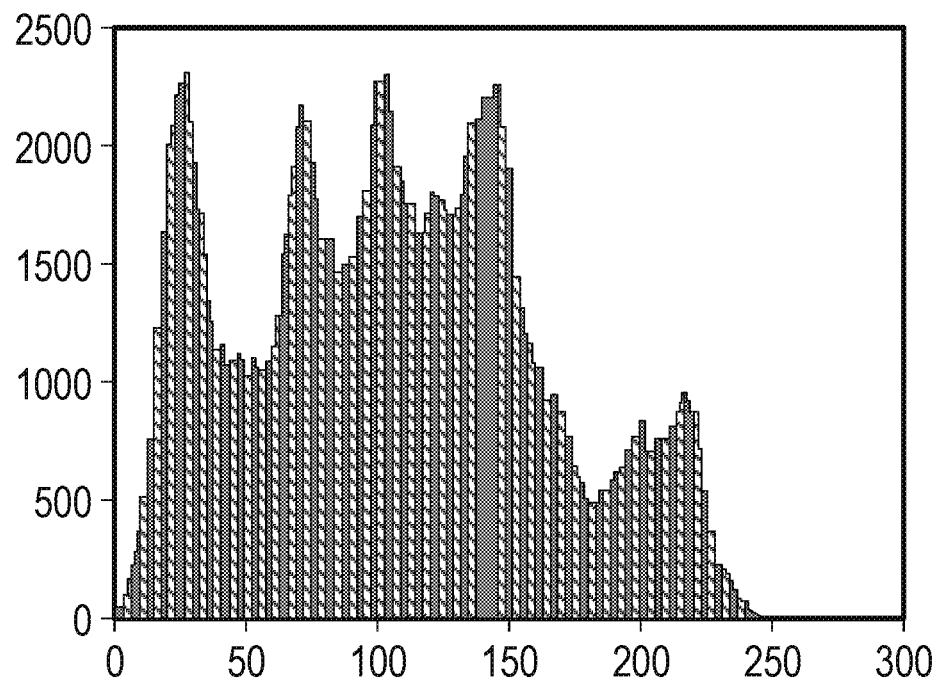
Figure 14D:
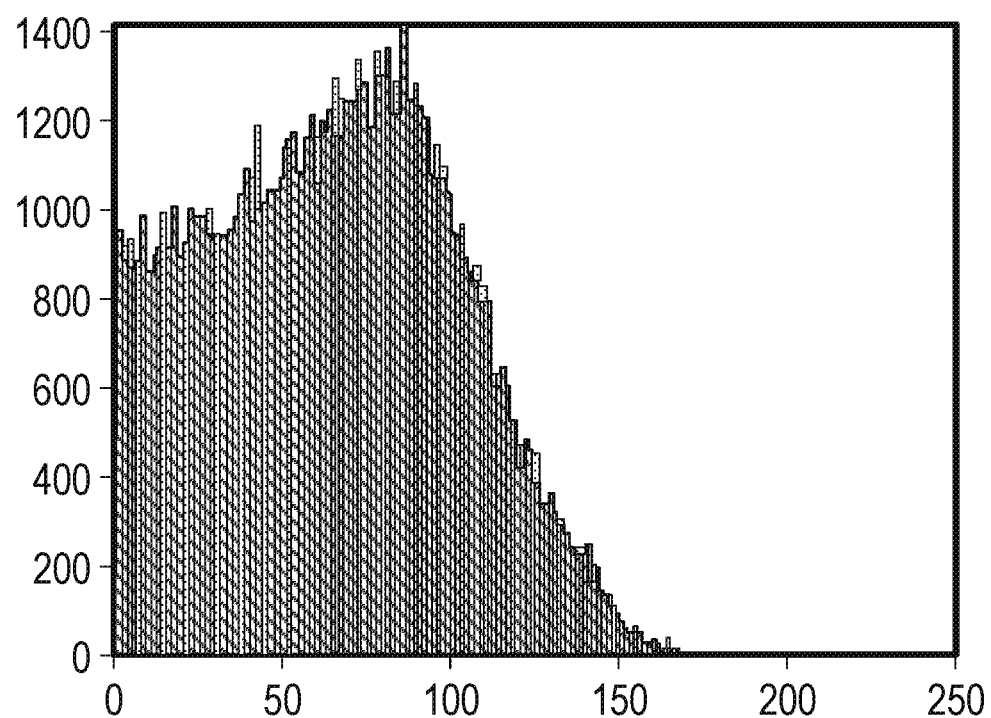
Figure 15A:
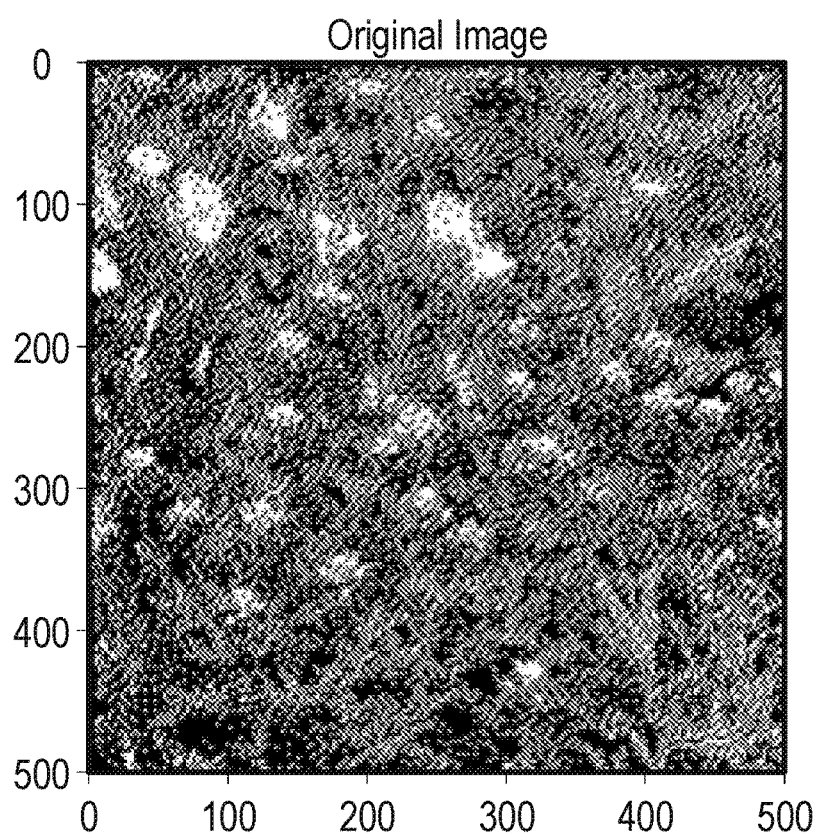
Figure 15B:
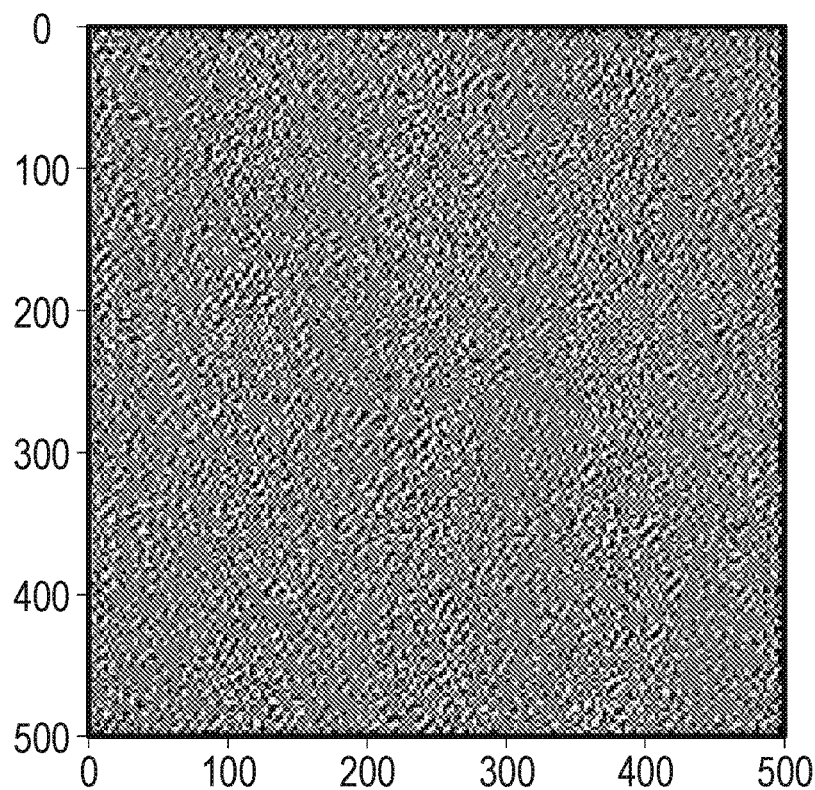
Figure 15C:
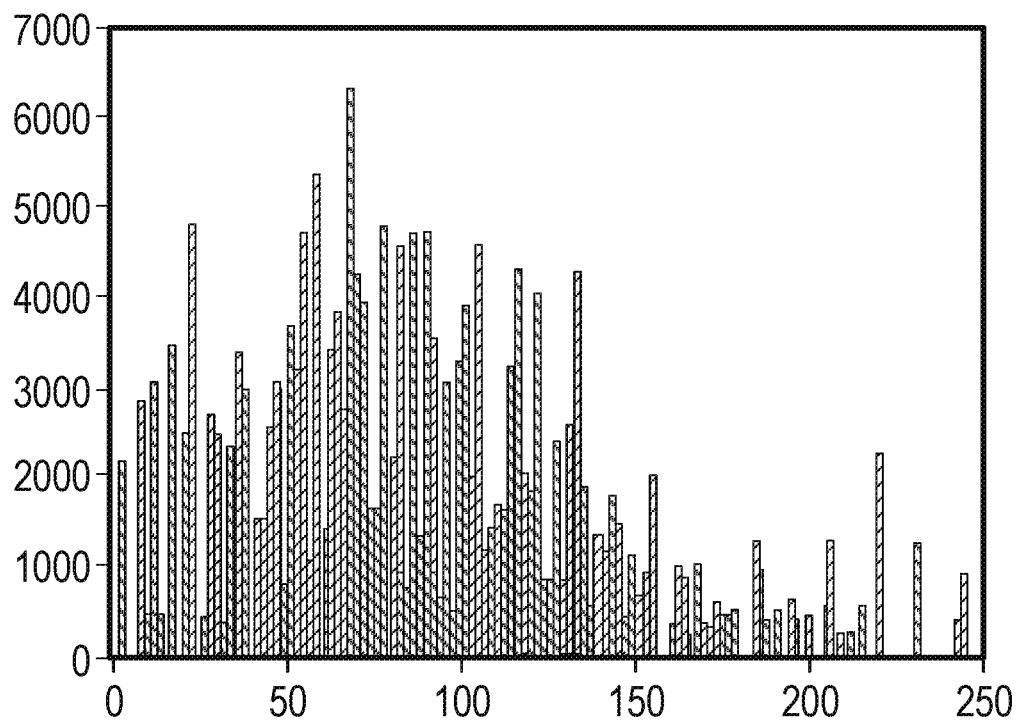
Figure 15D:
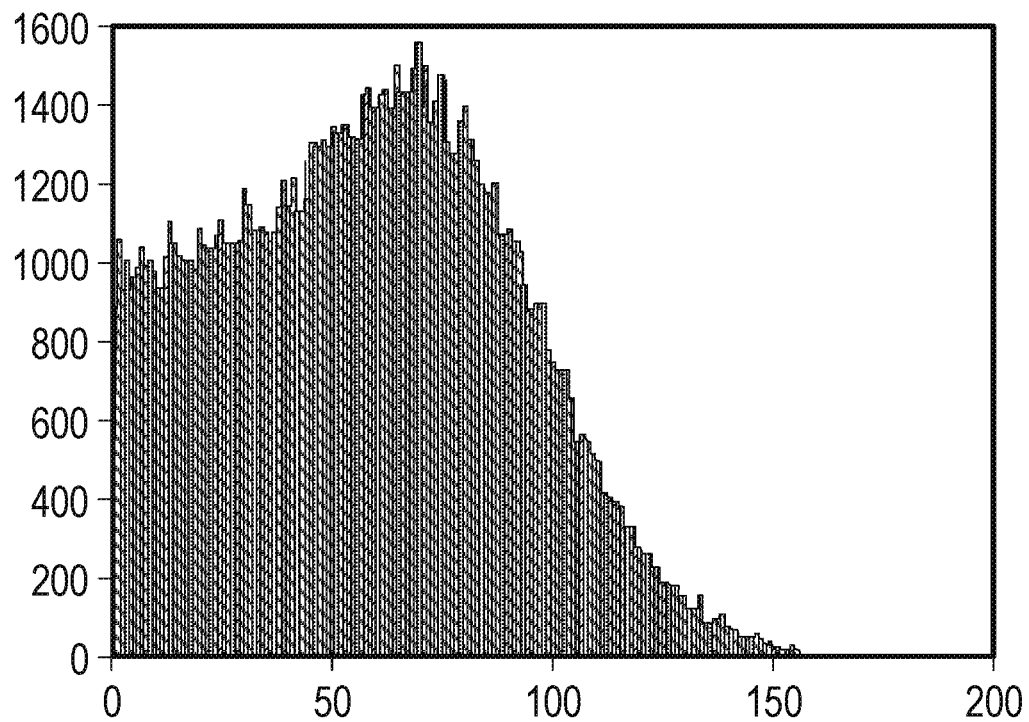
Figure 16A:
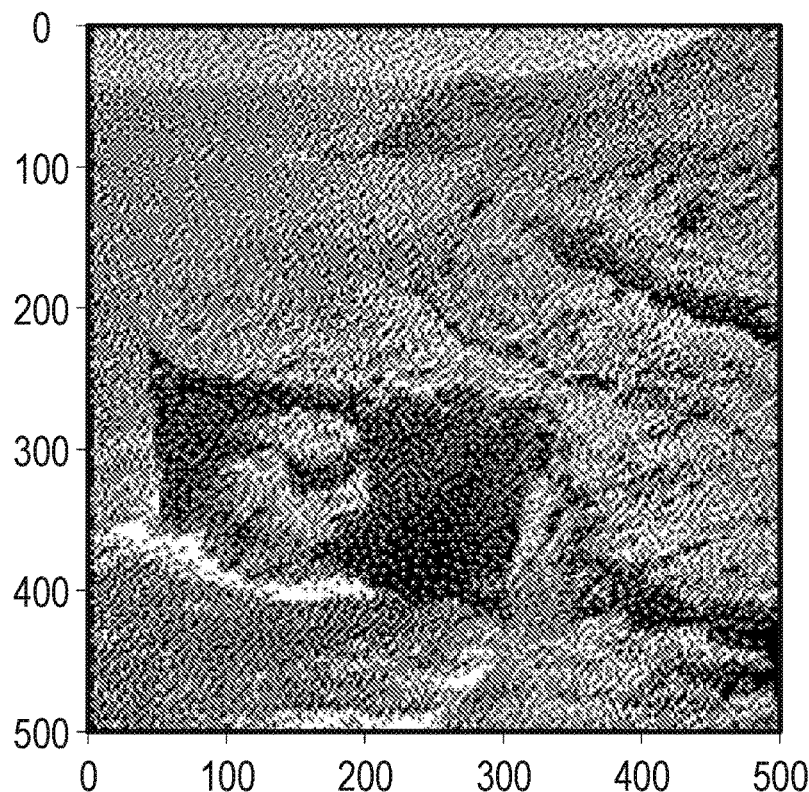
Figure 16B:
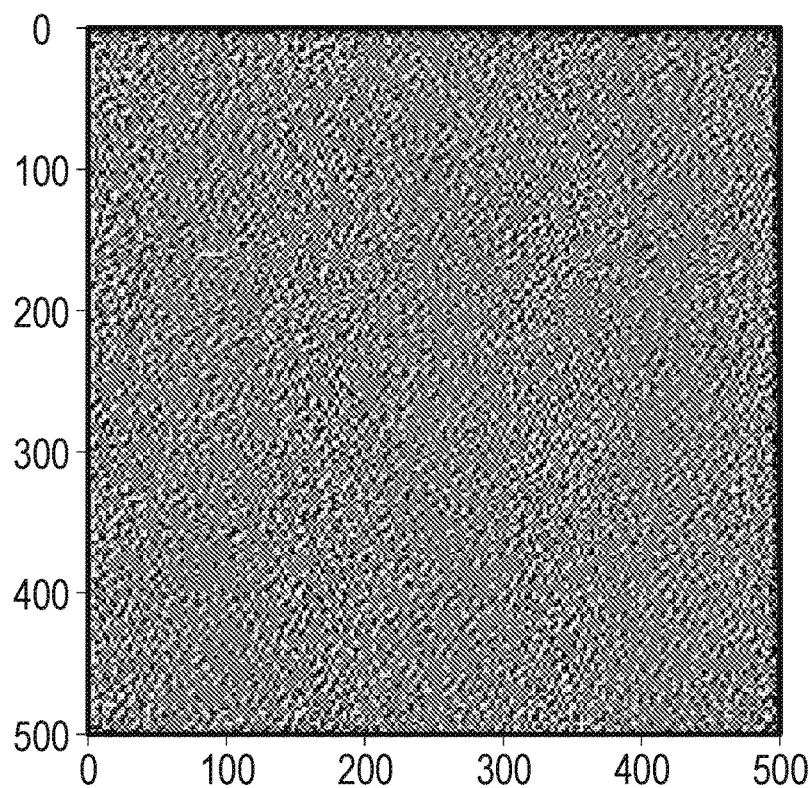
Figure 16C:
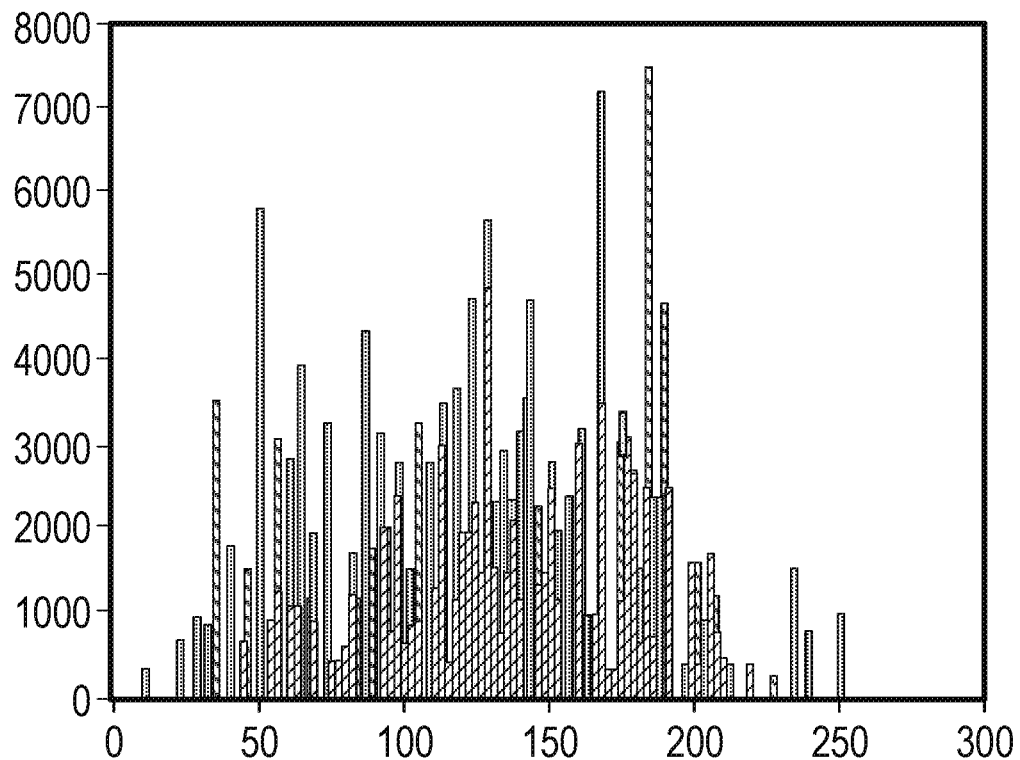
Figure 16D:
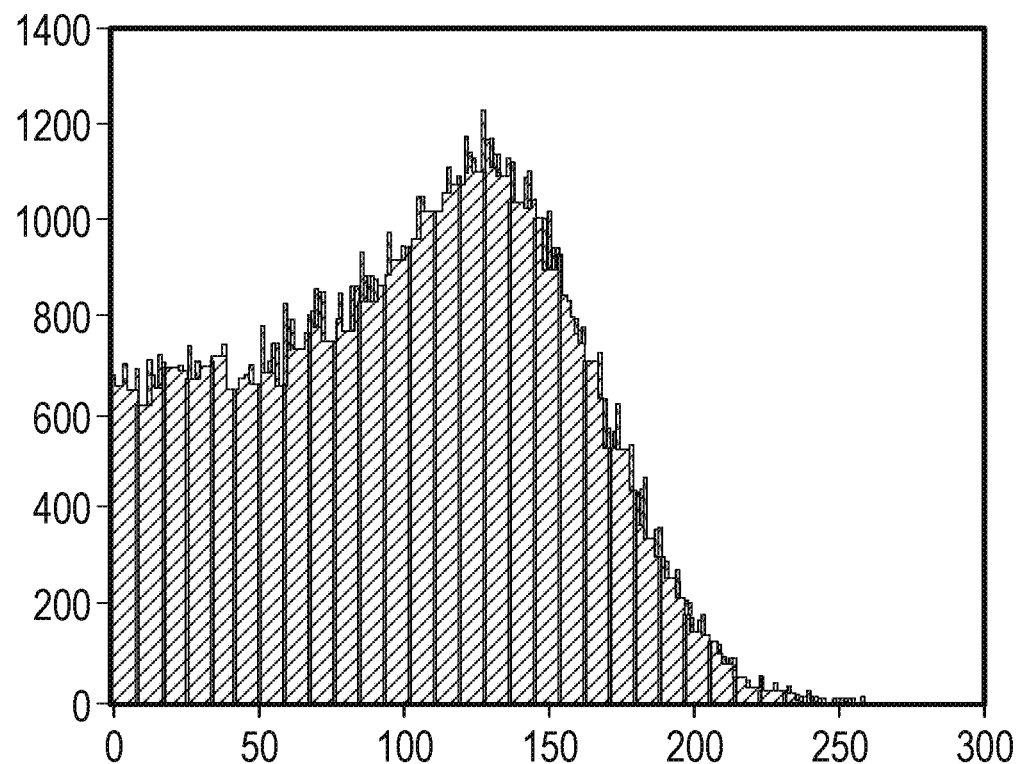

With reference to FIG. 13, shown is yet another flow chart that provides one example of the execution of another embodiment secure data transmission and storage system. In particular, FIG. 13 shows a decryption approach using a single random phase method shared between a sender and a receiver. For the encryption methodology shown in FIG. 13, an image can be multiplied by a single random matrix "key" exp[−j*Ø(x,y)].

Turning to FIGS. 14-16, shown are examples of images according to different embodiments of the present disclosure. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

About a hundred images were encrypted and tested, of which three are shown in FIGS. 14-16. In particular, FIG. 14A shows the Lena image, and FIG. 14B shows the encrypted Lena image. The histogram of the Lena image and the encrypted Lena image are shown in FIGS. 14C and 14D, respectively. The corresponding results of two other images are shown in FIGS. 15A-D and 16A-D, which display the original image, the encrypted image, the histogram of the original image, and the histogram of the encrypted image.

Figure 17:
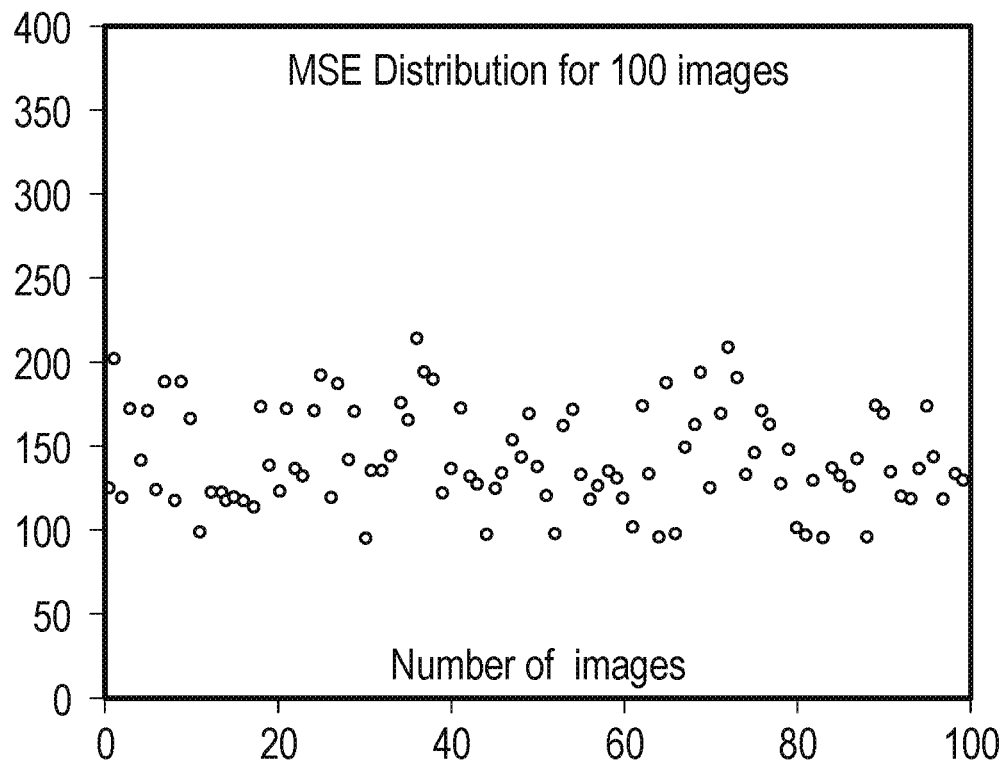
FIG. 17 shows an example graph of the mean squared error distribution for a pre-determined number of images encrypted and decrypted by the networked environment according to various example embodiments.
Figure 18:
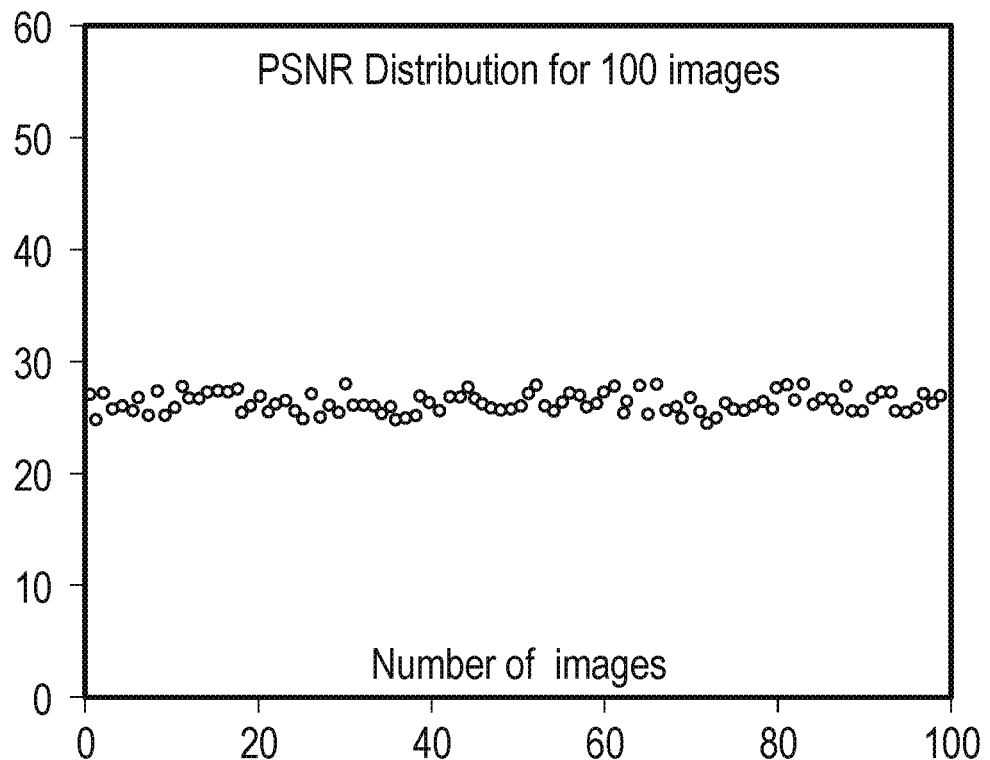
FIG. 18 shows an example graph of the peak signal-to-noise ration distribution for a pre-determined number of images encrypted and decrypted by the networked environment according to various example embodiments.

In addition to the histograms, the Peak-to-noise ratio (PSNR) and mean squared error (MSE) are shown in FIGS. 17 and 18, both of which provide the error between input image and output image. The MSE value can be described as:

$$SE = \left\{ \frac{1}{N1 \times N2} \sum_{i=1}^{N1} \sum_{j=1}^{N2} [Io(i,j) - Ie(i,j)]^2 \right\}^{\frac{1}{2}} \qquad (10)$$

where Io(i,j) is the pixel value of the original image, Ie(i,j) is the pixel value of the modified image, N1 is the row number and N2 is column number. Thus the PSNR is defined as:

$$PSNR = 20 \log\left[\frac{Imax}{MSE}\right] \qquad (11)$$

where $I_{max}$ is the maximum of pixel value of the image. To determine the encryption quality, the MSE and PSNR was computed for the hundred sample images and presented in the graphs shown in FIGS. 17 and 18, respectively. The PSNR values are low, as shown in FIG. 18. Therefore, the embodiments described herein can be implemented to ensure less error between the input image and the output image.

Figure 19:
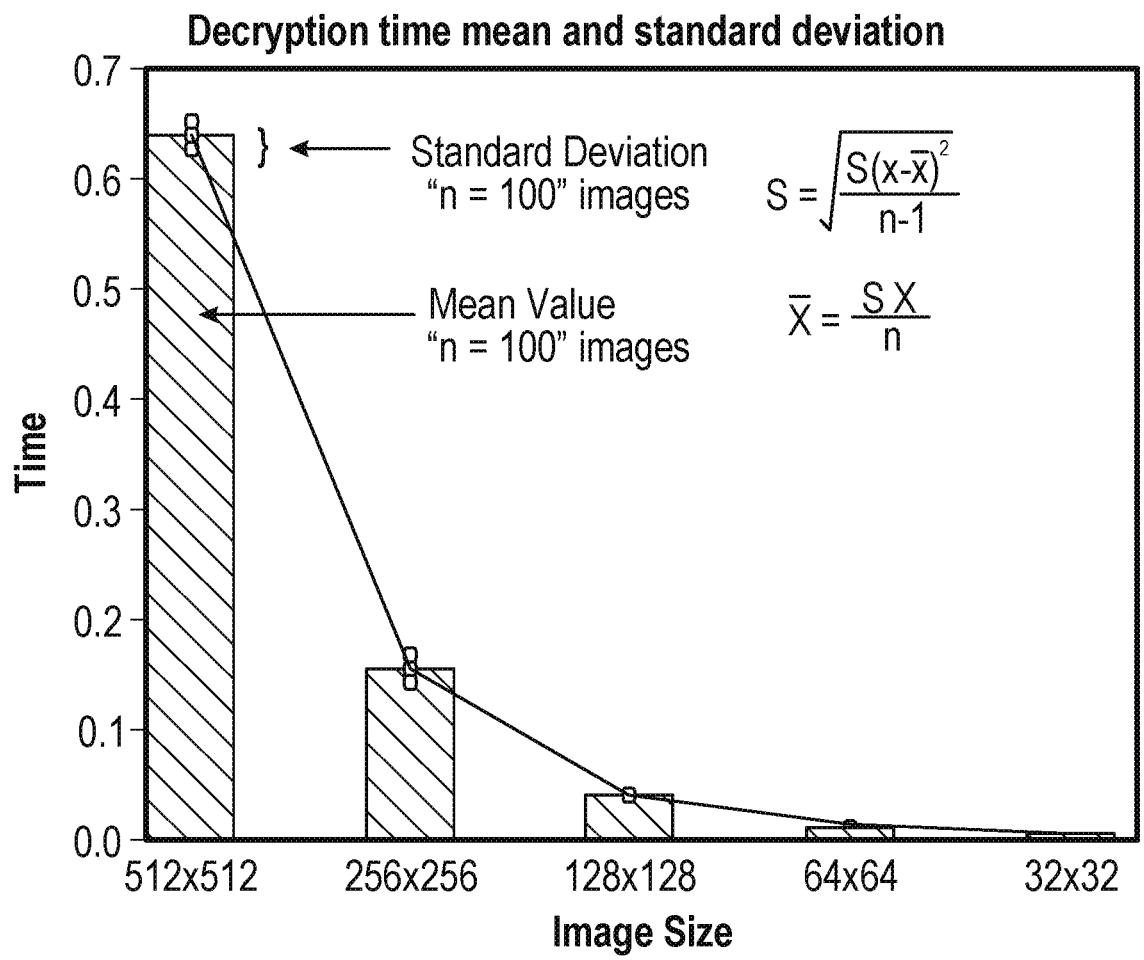
FIG. 19 shows an example graph of computation time results of applying the secure data transmission system to different image sizes in a networked environment according to various example embodiments.

With reference to FIG. 19, shown are computation time results of applying the encryption and decryption messages to different image sizes in an example networked environment 100. In order to formulate the equations that provide the expected speedup curves of the parallel program, the equations for the cloud computation time and cloud queuing and communication time which make up the execution of the whole program must be formulated.

The computation time results for decrypting over five hundred images using five hundred cloud servers using small cloud servers in parallel was measured. The graph shown in FIG. 19 presents the computation time for the different image sizes. The results from the experiment show that decryption time is less than about a minute. Since decryption execution time is less than about a minute, and encrypted mobile images are loosely parallel, the maximum throughput of execution can be achieved when individual cloud servers are assigned to each encrypted image received. The graph shown in FIG. 19 assumes that the cloud server boot time is about one minute. The cloud server boot time can affect the execution time. Using the modern version of Amdahl's Law, the exact speedup, Speedup (n), of the parallel image decryption program in n cloud servers is governed by the equation 12.

$$Speedup(n) = \frac{1}{b + \frac{f}{n}} \quad (12)$$

where f is the execution time of the decryption program in one cloud server; n is number of cloud servers; and b is the cloud server boot time. Since decryption is micro execution time, maximum speed up can be bounded with the speed of creating and booting cloud servers.

The demand for better and computationally cheap security techniques is growing day by day along with the fast growing technology of personal devices. As the security of personal or confidential data has become a prime concern and has to be computationally feasible in real time, the embodiments for secured transmission and storage of data disclosed herein can improve the functioning of special purpose computing devices configured to encrypt and decrypt data in a computing environment.

As evidenced by the graphs shown in FIGS. 17, 18, and 19, the embodiments disclosed herein for secured transmission and storage of data solve the technological problem of performing computations involving encryption or decryption of sensitive data, such as digital images, in a networked environment 100, such as, for example, a cloud computing environment. In particular, according to some embodiments, the secure data transmission and storage system provides a parallel scheme for image decryption in the cloud, based on complex conjugate symmetry property of DFT and a private random phase key. The dual key security feature adds a significant amount of complexity in decryption without the keys. The parallel approach enables the main process to consume majority of the time rather than decryption algorithm.

Figure 20:
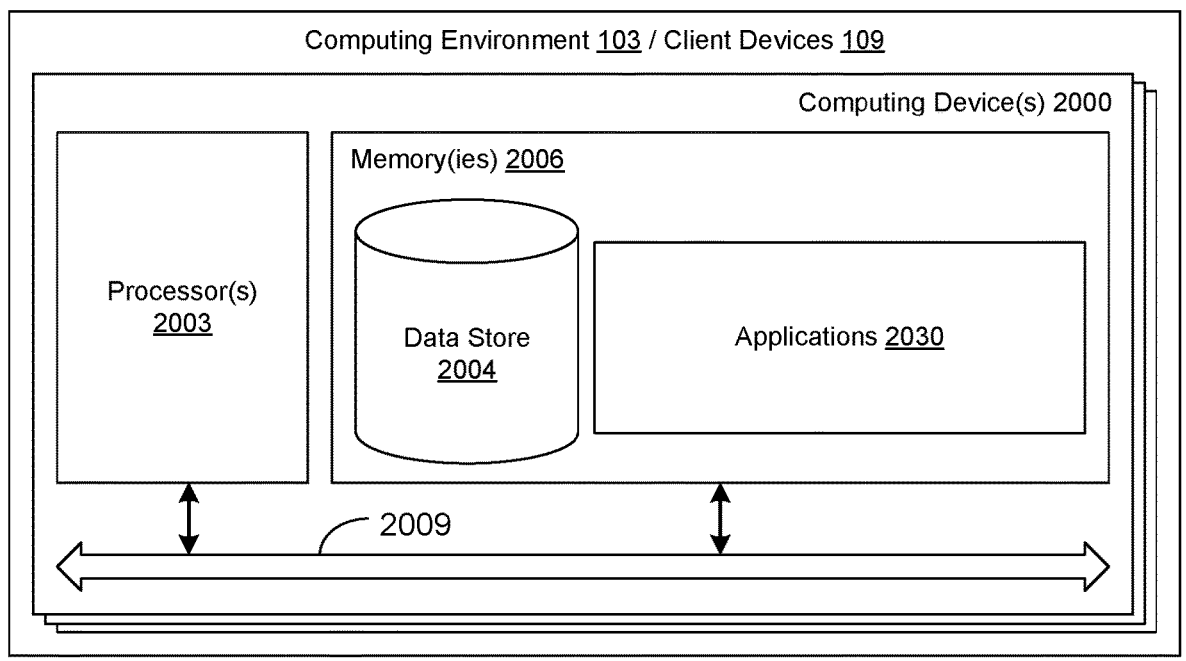
FIG. 20 is a schematic block diagram that provides one example illustration of a computing environment employed in the networked environment according to various example embodiments.

With reference to FIG. 20, shown is a schematic block diagram of the computing environment 103 or client device 109 according to an embodiment of the present disclosure. The computing environment 103 and client device 109 can each include one or more computing devices 2000. Each computing device 2000 includes at least one processor circuit, for example, having a processor 2003 and a memory 2006, both of which are coupled to a local interface 2009. To this end, the computing device 2000 can comprise, for example, at least one server computer or like device. The local interface 2009 can comprise, for example, a data bus with an accompanying address/control bus or other bus structure as can be appreciated.

Stored in the memory 2006 are both data and several components that are executable by the processor 2003. In particular, stored in the memory 2006 and executable by the processor 2003 are various applications 2030 that can be configured to perform various functions, such as encryption and/or decryption of data. Also stored in the memory 2006 can be a data store 2004 and other data. The data store 2004 can be a data store 130 or 148. In addition, an operating system can be stored in the memory 2006 and executable by the processor 2003.

It is understood that there can be other applications that are stored in the memory 2006 and are executable by the processor 2003 as can be appreciated. Where any component discussed herein is implemented in the form of software, any one of a number of programming languages can be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 2006 and are executable by the processor 2003. In this respect, the term "executable" means a program file that is in a form that can ultimately be run by the processor 2003. Examples of executable programs can be, for example, a compiled program that can be translated into machine code in a format that can be loaded into a random access portion of the memory 2006 and run by the processor 2003, source code that can be expressed in proper format such as object code that is capable of being loaded into a random access portion of the memory 2006 and executed by the processor 2003, or source code that can be interpreted by another executable program to generate instructions in a random access portion of the memory 2006 to be executed by the processor 2003, etc. An executable program can be stored in any portion or component of the memory 2006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 2006 is defined herein as including both volatile and nonvolatile memory and data storage components. Volatile components are those that do not retain data values upon loss of power. Nonvolatile components are those that retain data upon a loss of power. Thus, the memory 2006 can comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can comprise, for example, static random access memory (SRAM), dynamic random access memory (DRAM), or magnetic random access memory (MRAM) and other such devices. The ROM can comprise, for example, a programmable read-only memory (PROM), an erasable programmable read-only memory (EPROM), an electrically erasable programmable read-only memory (EEPROM), or other like memory device.

Also, the processor 2003 can represent multiple processors 2003, or decryption servers that can be executed in parallel, and the memory 2006 can represent multiple memories 2006 that operate in parallel processing circuits, respectively. In such a case, the local interface 2009 can be an appropriate network that facilitates communication between any two of the multiple processors 2003, between any processor 2003 and any of the memories 2006, or between any two of the memories 2006, etc. The local interface 2009 can comprise additional systems designed to coordinate this communication, including, for example, performing load balancing. The processor 2003 can be of electrical or of some other available construction.

Although the various applications 2030 that can be configured to perform various functions, such as encryption and/or decryption of data, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5-7 and 11-13 show the functionality and operation of an implementation of portions of the secure data transmission and storage system. If embodied in software, each block can represent a module, segment, or portion of code that comprises program instructions to implement the specified logical function(s). The program instructions can be embodied in the form of source code that comprises human-readable statements written in a programming language or machine code that comprises numerical instructions recognizable by a suitable execution system such as a processor 2003 in a computer system or other system. The machine code can be converted from the source code, etc. If embodied in hardware, each block can represent a circuit or a number of interconnected circuits to implement the specified logical function(s).

Although the flowcharts of FIGS. 5-7 and 11-13 show a specific order of execution, it is understood that the order of execution can differ from that which is depicted. For example, the order of execution of two or more blocks can be scrambled relative to the order shown. Also, two or more blocks shown in succession in FIGS. 5-7 and 11-13 can be executed concurrently or with partial concurrence. Further, in some embodiments, one or more of the blocks shown in FIGS. 5-7 and 11-13 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the various applications 2030 that can be configured to perform various functions, such as encryption and/or decryption of data, that comprises software or code can be embodied in any non-transitory computer-readable medium for use by or in connection with an instruction execution system such as, for example, a processor 2003 in a computer system or other system. The applications 2030 can include the receive service 118, an application executed as part of the firewall 121, the task application 124, the encryption services 127, and the client application 142. In this sense, the logic can comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Therefore, the following is claimed:

1. A system comprising:
    a memory device; and
    a mobile computing device comprising a hardware processor in communication with the memory device, the mobile computing device configured to at least:
       obtain at least one encryption key associated with the mobile computing device;
       perform at least one image transformation on an image to generate a transformed image;
       perform at least one image encryption on the transformed image to generate a transformed encrypted image based at least in part on the at least one encryption key;
       perform at least one image inverse transformation on the transformed encrypted image to generate an encrypted image; and
       transmit the encrypted image to a server for storage in a cloud storage service.

2. The system of claim 1, wherein the mobile computing device is further configured to:

obtain at least one second encryption key;
perform the at least one image transformation on a second image to generate a second transformed image;
perform the at least one image encryption on the second transformed image to generate a second transformed encrypted image based at least in part on the at least one second encryption key;
perform the at least one image inverse transformation on the second transformed encrypted image to generate a second encrypted image; and
transmit the second encrypted image to the server for storage in the cloud storage service.

3. The system of claim 1, wherein the mobile computing device is further configured to:
receive the encrypted image from the cloud storage service;
perform the at least one image transformation on the encrypted image to generate the transformed encrypted image;
perform at least one image decryption on the transformed encrypted image to generate the transformed image based at least in part on the at least one encryption key; and
perform the at least one image inverse transformation on the transformed image to generate the image.

4. The system of claim 3, wherein the at least one image decryption is configured to reverse the at least one image encryption when a same key is used.

5. The system of claim 1, wherein the mobile computing device is further configured to:
determine an image quality threshold value for at least one of: a mean square error, a signal to noise ratio, or a Bovik index based at least in part on a bandwidth on an internet connection associated with the mobile computing device; and
decrease a resolution of the image when generating the transformed image, the resolution of the image being based at least in part on an image quality of the image meeting the image quality threshold value.

6. The system of claim 1, wherein the at least one image transformation comprises performing a discrete Fourier transform on the image to generate the transformed image.

7. The system of claim 1, wherein the at least one image encryption comprises:
decomposing DCT coefficients of the transformed image into a plurality of Fibonacci P-code bit-planes based at least in part on a first encryption key of the at least one encryption key;
shuffling an order of the plurality of Fibonacci P-code bit-planes to generate a shuffled plurality of Fibonacci P-code bit-planes based at least in part on a second encryption key of the at least one encryption key;
combining the shuffled plurality of Fibonacci P-code bit-planes to generate a combined plurality of Fibonacci P-code bit-planes based at least in part on a third encryption key of the at least one encryption key; and
mapping the combined plurality of Fibonacci P-code bit-planes to an RGB plane to generate the encrypted image.

8. The system of claim 1, wherein the at least one encryption key associated with the mobile computing device is obtained from a remote server.

9. A method comprising:
identifying, via at least one computing device, an encryption key associated with a user account;
transforming, via the at least one computing device, a file into a transformed file image using a transformation algorithm;
encrypting, via the at least one computing device, the transformed file into a transformed encrypted file using an encryption algorithm based at least in part on the encryption key; and
transforming, via the at least one computing device, the transformed encrypted file into an encrypted file using an inverse transformation algorithm.

10. The method of claim 9, further comprising obtaining, via the at least one computing device, the file from a secure cloud storage.

11. The method of claim 9, further comprising transmitting the encrypted file to a mobile computing device associated with the user account.

12. The method of claim 11, wherein the encrypted file is transmitted on a first side of a firewall, and the file is transformed and encrypted on a second side of the firewall.

13. The method of claim 9, further comprising:
receiving, via the at least one computing device, a plurality of encrypted files from a plurality of mobile computing devices, individual ones of the plurality of mobile computing devices corresponding to a respective user account;
transforming, via the at least one computing device, the plurality of encrypted files to generate a plurality of transformed encrypted files using the transformation algorithm;
decrypting, via the at least one computing device, individual ones of the plurality of transformed encrypted files to generate a plurality of transformed files using a decryption algorithm based at least in part on a respective encryption key that corresponds to the respective user account;
transforming, via the at least one computing device, the plurality of transformed files to generate a plurality of files using the inverse transformation algorithm; and
storing, via the at least one computing device, the plurality of files in a secure cloud storage.

14. The method of claim 13, wherein the at least one computing device comprises a plurality of parallel decryption cloud-based servers and the plurality of encrypted files are queued for parallel decryption and transformation by the plurality of parallel decryption cloud-based servers.

15. A system comprising:
a cloud-based storage comprising a file; and
at least one computing device in communication with the cloud-based storage, the at least one computing device configured to at least:
receive a request for the file from a remote computing device associated with a user account;
identify an encryption key associated with the user account, wherein the encryption key is a private random phase key;
retrieve the file from the cloud-based storage; and
apply an encryption algorithm to the file to generate an encrypted file based at least in part on the encryption key, the encryption algorithm including a transformation and an inverse transformation of the file, wherein the encryption algorithm utilizes complex conjugate properties of the file.

16. The system of claim 15, wherein the at least one computing device is further configured to transmit the encrypted file to the remote computing device.

17. The system of claim 15, wherein the at least one computing device comprises a plurality of encryption servers executed in parallel, and the file is encrypted by one of the plurality of encryption servers.

18. The system of claim 17, wherein the plurality of encryption servers are spawned on demand.

19. The system of claim 15, wherein the at least one computing device is further configured to generate a network page that includes data from the file.

20. The system of claim 15, wherein the file is retrieved from the cloud-based storage via a first network, and the request for the file is received via a second network.

\* \* \* \* \*